US012806714B2

(12) United States Patent
Onose

(10) Patent No.: US 12,806,714 B2
(45) Date of Patent: Nov. 24, 2026

(54) LASER MACHINING METHOD AND LASER MACHINING SYSTEM

(71) Applicant: Gigaphoton Inc., Tochigi (JP)

(72) Inventor: Takashi Onose, Oyama (JP)

(73) Assignee: Gigaphoton Inc., Tochigi (JP)

( * ) Notice: Subject to any disclaimer, the term of this patent is extended or adjusted under 35 U.S.C. 154(b) by 747 days.

(21) Appl. No.: 18/332,588

(22) Filed: Jun. 9, 2023

(65) Prior Publication Data

US 2023/0311247 A1 Oct. 5, 2023

Related U.S. Application Data

(63) Continuation of application No. PCT/JP2021/002765, filed on Jan. 27, 2021.

(51) Int. Cl.
*B23K 26/08* (2014.01)
*B23K 26/38* (2014.01)

(52) U.S. Cl.
CPC ........ *B23K 26/0876* (2013.01); *B23K 26/083* (2013.01); *B23K 26/38* (2013.01)

(58) Field of Classification Search
None
See application file for complete search history.

(56) References Cited

U.S. PATENT DOCUMENTS

2003/0012540 A1 1/2003 Kato et al.
2004/0016730 A1 1/2004 Liu
2004/0084427 A1* 5/2004 Talwar ................. B23K 26/032 219/121.73
2006/0119376 A1* 6/2006 Tunaboylu ......... G01R 1/06738 219/121.69

(Continued)

FOREIGN PATENT DOCUMENTS

JP H03-157917 A 7/1991
JP H06-170563 A 6/1994

(Continued)

OTHER PUBLICATIONS

JP H06-170563 A (Mori, Mikio et al.) Jun. 21, 1994 [retrieved on Mar. 7, 2026]. Retrieved from Foreign Image and Text database, translation by Clarivate Analytics. (Year: 1994).*
JP H11-320156 A (Kinoshita, Shingen) Nov. 24, 1999 [retrieved on Mar. 7, 2026]. Retrieved from Foreign Image and Text database, translation by Clarivate Analytics. (Year: 1999).*
An Office Action issued by the Japanese Patent Office on Jul. 9, 2024, which corresponds to Japanese Patent Application 2022-577862 and is related to U.S. Appl. No. 18/332,588.

(Continued)

*Primary Examiner* — John J Norton
(74) *Attorney, Agent, or Firm* — Studebaker Brackett PLLC

(57) ABSTRACT

A laser machining method forms a machined portion in a machining area of a machining object by irradiating the machining area with a pulse laser beam. The laser machining method includes an irradiation process of irradiating the machining area with the pulse laser beam output from an excimer laser apparatus by guiding the pulse laser beam to part of the machining area and moving the guided pulse laser beam through irradiation spots, and a movement process of moving the machining object in a height direction of the machining object. The irradiation process is performed at a plurality of height positions on the machining object moved in the height direction in the movement process. In the irradiation process, at least part of each of the irradiation spots of the pulse laser beam overlaps another irradiation spot adjacent to the irradiation spot.

20 Claims, 21 Drawing Sheets

(56) References Cited

U.S. PATENT DOCUMENTS

| | | | | |
|---|---|---|---|---|
| 2011/0259631 | A1* | 10/2011 | Rumsby | B23K 26/066 219/121.7 |
| 2018/0318963 | A1 | 11/2018 | Marti et al. | |
| 2019/0001442 | A1* | 1/2019 | Unrath | B23K 26/382 |
| 2019/0283179 | A1 | 9/2019 | Kakizaki | |

FOREIGN PATENT DOCUMENTS

| | | | |
|---|---|---|---|
| JP | H11-320156 | A | 11/1999 |
| JP | 2000-271770 | A | 10/2000 |
| JP | 2002-372641 | A | 12/2002 |
| JP | 2006-503713 | A | 2/2006 |
| JP | 2009-023215 | A | 2/2009 |
| JP | 2018-016525 | A | 2/2018 |
| JP | 2018-187678 | A | 11/2018 |
| WO | 2004/011187 | A1 | 2/2004 |
| WO | 2018/100638 | A1 | 6/2018 |

OTHER PUBLICATIONS

International Search Report issued in PCT/JP2021/002765; mailed Apr. 6, 2021.

Written Opinion of the International Searching Authority issued in PCT/JP2021/002765; mailed Apr. 6, 2021.

An Office Action issued by the Japanese Patent Office on Dec. 3, 2024, which corresponds to Japanese Patent Application 2022-577862 and is related to U.S. Appl. No. 18/332,588.

* cited by examiner

LASER MACHINING METHOD AND LASER MACHINING SYSTEM

CROSS-REFERENCE TO RELATED APPLICATIONS

The present application is a continuation application of International Application No. PCT/JP2021/002765, filed on Jan. 27, 2021, the entire contents of which are hereby incorporated by reference.

BACKGROUND

1. Technical Field

The present disclosure relates to a laser machining method and a laser machining system.

2. Related Art

Recently, in a semiconductor exposure apparatus, resolving power improvement has been requested along with miniaturization and high integration of a semiconductor integrated circuit. Thus, the wavelength of light output from an exposure light source has been shortened. Examples of a gas laser apparatus for exposure include a KrF excimer laser apparatus configured to output a laser beam having a wavelength of approximately 248 nm and an ArF excimer laser apparatus configured to output a laser beam having a wavelength of approximately 193 nm.

The KrF excimer laser apparatus and the ArF excimer laser apparatus each have a wide spectrum line width of 350 pm to 400 pm for spontaneous oscillation light. Thus, chromatic aberration occurs in some cases when a projection lens is made of a material that transmits ultraviolet such as KrF and ArF laser beams. This can lead to resolving power decrease. Thus, the spectrum line width of a laser beam output from the gas laser apparatus needs to be narrowed so that chromatic aberration becomes negligible. To narrow the spectrum line width, a line narrowing module (LNM) including a line narrowing element (for example, etalon or grating) is provided in a laser resonator of the gas laser apparatus in some cases. In the following, a gas laser apparatus that achieves narrowing of the spectrum line width is referred to as a line narrowed gas laser apparatus.

LIST OF DOCUMENTS

Patent Document 1: Japanese Unexamined Patent Application Publication No. 2000-271770

Patent Document 2: Japanese Unexamined Patent Application Publication No. 2018-16525

Patent Document 3: Japanese Unexamined Patent Application Publication No. 3-157917

SUMMARY

A laser machining method according to an aspect of the present disclosure forms a machined portion in a machining area of a machining object by irradiating the machining area with a pulse laser beam. The laser machining method includes an irradiation process of irradiating the machining area with the pulse laser beam output from an excimer laser apparatus by guiding the pulse laser beam to part of the machining area and moving the guided pulse laser beam through irradiation spots, and a movement process of moving the machining object in a height direction of the machining object. The irradiation process may be performed at a plurality of height positions on the machining object moved in the height direction in the movement process. In the irradiation process, at least part of each of the irradiation spots of the pulse laser beam may overlap another irradiation spot adjacent to the irradiation spot.

A laser machining system according to an aspect of the present disclosure forms a machined portion in a machining area of a machining object by irradiating the machining area with a pulse laser beam. The laser machining system includes an irradiation optical system configured to irradiate the machining area with the pulse laser beam output from an excimer laser apparatus by guiding the pulse laser beam to part of the machining area and moving the guided pulse laser beam through irradiation spots, an fθ lens through which the pulse laser beam from the irradiation optical system is condensed to the machining area, and a movement stage configured to move the machining object in a height direction of the machining object. The irradiation optical system may perform irradiation with the pulse laser beam at a plurality of height positions on the machining object moved in the height direction by the movement stage. At least part of each of the irradiation spots of the pulse laser beam may overlap another irradiation spot adjacent to the irradiation spot.

BRIEF DESCRIPTION OF THE DRAWINGS

Embodiments of the present disclosure will be described below merely as examples with reference to the accompanying drawings.

DESCRIPTION OF EMBODIMENTS

1. Overview
2. Description of laser machining system and laser machining method of comparative example
   2.1 Configuration
   2.2 Operation
   2.3 Problem
3. Description of laser machining system and laser machining method of Embodiment 1
   3.1 Configuration
   3.2 Operation
   3.3 Effect
4. Description of laser machining system and laser machining method of Embodiment 2
   4.1 Configuration
   4.2 Operation
   4.3 Effect
5. Description of laser machining system and laser machining method of Embodiment 3
   5.1 Configuration
   5.2 Operation
   5.3 Effect
6. Description of laser machining system and laser machining method of Embodiment 4
   6.1 Configuration
   6.2 Operation
   6.3 Effect
7. Description of laser machining system and laser machining method of Embodiment 5
   7.1 Configuration
   7.2 Operation
   7.3 Effect
8. Description of modification of gas laser apparatus Embodiments of the present disclosure will be described below in detail with reference to the accompanying drawings.

The embodiments described below are examples of the present disclosure, and do not limit the contents of the present disclosure. Not all configurations and operations described in each embodiment are necessarily essential as configurations and operations of the present disclosure. Components identical to each other are denoted by the same reference sign, and duplicate description thereof will be omitted.

1. Overview

Embodiments of the present disclosure relate to a laser machining system and a laser machining method that form a machined portion in a machining area of a machining object by irradiating the machining area with a pulse laser beam. A machining area is an area irradiated with a pulse laser beam to form a machined portion. The machined portion is formed inside the outer boundary of the machining area. The machined portion is, for example, a through-hole or a groove but not particularly limited.

2. Description of Laser Machining System and Laser Machining Method of Comparative Example

2.1 Configuration

A laser machining system 10 and a laser machining method of a comparative example will be described below. The comparative example of the present disclosure is an example that the applicant recognizes as known only by the applicant, but is not a publicly known example that is recognized by the applicant.

Figure 1:
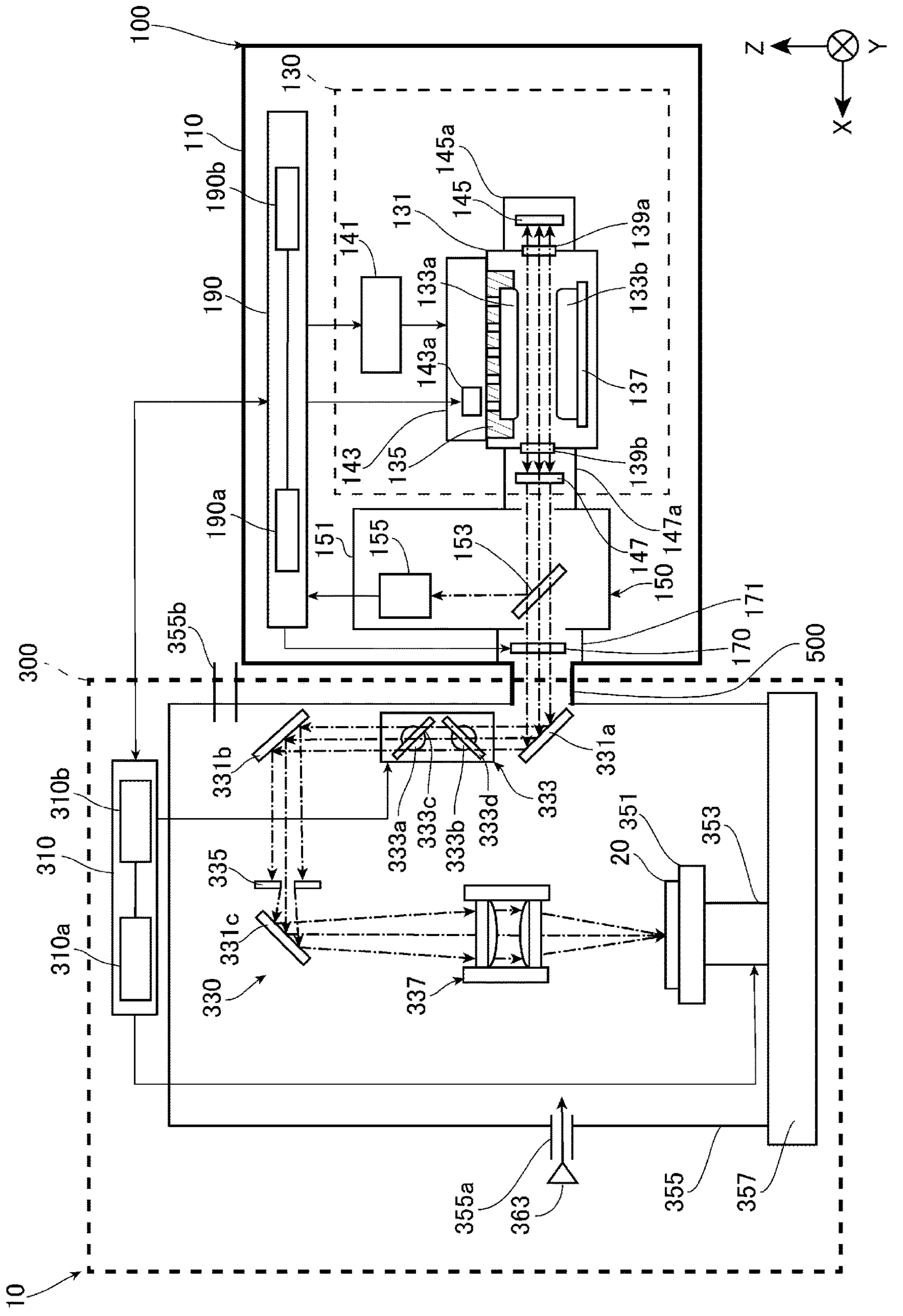
FIG. 1 is a schematic diagram illustrating an example of the entire schematic configuration of a laser machining system of a comparative example.

FIG. 1 is a schematic diagram illustrating an example of the entire schematic configuration of the laser machining system 10. The laser machining system 10 includes, as main components, a gas laser apparatus 100, a laser machining apparatus 300, and an optical path pipe 500 connecting the gas laser apparatus 100 and the laser machining apparatus 300. In the following description, a Z direction is defined as a direction parallel to the direction of the optical axis of a pulse laser beam incident on a machining object 20, an X direction is defined as a direction orthogonal to the Z direction, and a Y direction is defined as a direction orthogonal to the X and Z directions. The Z direction is also the height direction of the machining object 20.

The gas laser apparatus 100 is an ArF excimer laser apparatus that uses, for example, mixed gas containing argon (Ar), fluorine ($F_2$), and neon (Ne). In this case, the gas laser apparatus 100 outputs a pulse laser beam having a central wavelength of approximately 193.40 nm. The gas laser apparatus 100 may be any other gas laser apparatus than an ArF excimer laser apparatus and may be a KrF excimer laser apparatus that uses, for example, mixed gas containing krypton (Kr), $F_2$, and Ne. In this case, the gas laser apparatus 100 outputs a pulse laser beam having a central wavelength of approximately 248 nm. The mixed gas containing Ar, $F_2$, and Ne as laser media, and the mixed gas containing Kr, $F_2$, and Ne as laser media are referred to as laser gas in some cases.

The gas laser apparatus 100 includes a housing 110, a master oscillator 130, a monitor module 150, a shutter 170, and a laser processor 190 as main components. The master oscillator 130, the monitor module 150, the shutter 170, and the laser processor 190 are disposed in the internal space of the housing 110.

The master oscillator 130 includes a laser chamber 131, a charger 141, a pulse power module 143, a rear mirror 145, and an output coupling mirror 147. FIG. 1 illustrates an internal configuration of the laser chamber 131 when viewed in a direction substantially orthogonal to the traveling direction of a laser beam.

The laser chamber 131 has an internal space in which light is generated through excitation of the laser gas. The laser gas is supplied from a non-illustrated laser gas supply source disposed in the gas laser apparatus 100 to the internal space of the laser chamber 131 through a non-illustrated pipe. The light generated through excitation of the laser gas travels to windows 139*a* and 139*b* to be described later.

A pair of electrodes 133*a* and 133*b* are disposed in the internal space of the laser chamber 131. The electrodes 133*a* and 133*b* are discharge electrodes for exciting a laser medium through glow discharge. In the present example, the electrode 133*a* is a cathode, and the electrode 133*b* is an anode. The electrodes 133*a* and 133*b* face each other. The longitudinal direction of the electrodes 133*a* and 133*b* is aligned with the traveling direction of light generated by high voltage applied between the electrodes 133*a* and 133*b*.

The electrode 133*a* is supported by an electrical insulating unit 135. The electrical insulating unit 135 blocks an opening formed through the laser chamber 131. Conductive portions are embedded in the electrical insulating unit 135, and high voltage supplied from the pulse power module 143 is applied to the electrode 133*a* through the conductive portions. The electrode 133*b* is supported by a return plate 137. The return plate 137 is connected to the inner surface of the laser chamber 131 through a non-illustrated wire.

The charger 141 is a direct-current power source device configured to charge a non-illustrated charging capacitor in the pulse power module 143 with predetermined voltage. The pulse power module 143 includes a switch 143*a* controlled by the laser processor 190. When the switch 143*a* is turned on, the pulse power module 143 generates high voltage in pulses from electric energy held in the charger 141 and applies the high voltage between the electrodes 133*a* and 133*b*.

When the high voltage is applied between the electrodes 133*a* and 133*b*, insulation between the electrodes 133*a* and 133*b* breaks down and discharge occurs. A laser medium in the laser chamber 131 is excited by energy of the discharge and transitions to a higher energy level. When transitioning to a lower energy level thereafter, the excited laser medium discharges light in accordance with the difference between the energy levels.

The windows 139*a* and 139*b* are provided at the laser chamber 131. The windows 139*a* and 139*b* face each other and sandwich a space between the electrodes 133*a* and 133*b* in the traveling direction of light. The window 139*a* is positioned on one end side in the traveling direction of a laser beam in the laser chamber 131, and the window 139*b* is positioned on the other end side in the traveling direction of a laser beam in the laser chamber 131. The window 139*a* is fitted to a hole of the laser chamber 131 but may be held by a tubular holder. When the window 139*a* is held by a holder, the holder has one end connected to the wall surface of the laser chamber 131 and has a hollow part communicating with a hole of the laser chamber 131, and the window 139*a* is disposed on the other end surface of the holder, facing the hollow part. Similarly to the window 139*a*, the window 139*b* is fitted to a hole but may be held by a tubular holder. As described later, in the gas laser apparatus 100, light oscillates on an optical path including the laser chamber 131 and a laser beam is output. Accordingly, a laser beam generated in the internal space of the laser chamber 131 is output to the outside of the laser chamber 131 through the windows 139*a* and 139*b*. The windows 139*a* and 139*b* are tilted at the Brewster angle relative to the traveling direction of the laser beam to reduce reflection of p-polarized light of the laser beam.

The rear mirror 145 faces the window 139*a*, and the output coupling mirror 147 faces the window 139*b*. The rear mirror 145 is coated with a high reflection film, and the output coupling mirror 147 is coated with a partial reflection film. The rear mirror 145 reflects a laser beam output from the window 139*a* back to the laser chamber 131 at high reflectance. The output coupling mirror 147 transmits part of a laser beam output from the window 139*b* and reflects the other part thereof back to the internal space of the laser chamber 131 through the window 139*b*. The output coupling mirror 147 is constituted by, for example, an element obtained by depositing a dielectric multi-layered film on a substrate made of calcium fluoride.

Accordingly, the rear mirror 145 and the output coupling mirror 147 constitute a Fabry-Perot laser resonator, and the laser chamber 131 is disposed on the optical path of the laser resonator. A laser beam output from the laser chamber 131 reciprocates between the rear mirror 145 and the output coupling mirror 147. The reciprocating laser beam is amplified each time the laser beam passes through a laser gain space between the electrodes 133*a* and 133*b*. Part of the amplified light is output as a pulse laser beam through the output coupling mirror 147.

The rear mirror 145 is disposed in the internal space of a housing 145*a* connected to one end side of the laser chamber 131. The output coupling mirror 147 is disposed in the internal space of an optical path pipe 147*a* connected to the other end side of the laser chamber 131.

The monitor module 150 is disposed on the optical path of the pulse laser beam output from the output coupling mirror 147. The monitor module 150 includes, for example, a housing 151, a beam splitter 153, and an optical sensor 155. An opening is formed through the housing 151, and the optical path pipe 147*a* is connected around the opening. Accordingly, the internal space of the housing 151 communicates with the internal space of the optical path pipe 147*a*. The beam splitter 153 and the optical sensor 155 are disposed in the internal space of the housing 151. The beam splitter 153 and the optical sensor 155 are optical elements on which the pulse laser beam output from the output coupling mirror 147 is incident.

The beam splitter 153 transmits the pulse laser beam output from the output coupling mirror 147 toward the shutter 170 at high transmittance and reflects part of the pulse laser beam toward the light receiving surface of the optical sensor 155. The optical sensor 155 measures pulse energy E that is the actual value of pulse energy of the pulse laser beam incident on the light receiving surface. The optical sensor 155 is electrically connected to the laser processor 190 and outputs a signal indicating data of the measured pulse energy E to the laser processor 190.

The laser processor 190 of the present disclosure is a processing device including a storage device 190*a* in which a control program is stored and a CPU 190*b* configured to execute the control program. The laser processor 190 is specially configured or programmed to execute various kinds of processing included in the present disclosure. The laser processor 190 controls the entire gas laser apparatus 100.

The laser processor 190 receives the signal indicating data of the pulse energy E from the optical sensor 155 of the monitor module 150. The laser processor 190 is electrically connected to a laser machining processor 310 of the laser machining apparatus 300 and transmits and receives various signals to and from the laser machining processor 310. For example, the laser processor 190 receives, from the laser machining processor 310, signals indicating data of a light emission trigger Tr to be described later and a target pulse energy Et to be described later, or the like. The laser processor 190 controls charging voltage of the charger 141 based on the pulse energy E and the target pulse energy Et received from the optical sensor 155 and the laser machining processor 310. Pulse energy of a pulse laser beam is controlled by controlling the charging voltage of the charger 141. Moreover, the laser processor 190 transmits a command signal for turning on or off the switch 143*a* to the pulse power module 143. In addition, the laser processor 190 controls opening and closing of the shutter 170.

The shutter 170 is disposed on the optical path of a pulse laser beam having transmitted through the beam splitter 153 of the monitor module 150. The shutter 170 is disposed in the internal space of an optical path pipe 171 connected to the housing 151 of the monitor module 150. An opening is formed on a side of the housing 151 opposite a side on which the optical path pipe 147*a* is connected, and the optical path pipe 171 is connected around the opening. Accordingly, the internal space of the optical path pipe 171 communicates with the internal space of the housing 151 and the internal space of the optical path pipe 147*a*. The optical path pipe 171 also communicates with the optical path pipe 500 through an opening formed through the housing 110.

The shutter 170 is electrically connected to the laser processor 190. The laser processor 190 controls the shutter 170 to close until a difference ΔE between the pulse energy E received from the monitor module 150 and the target pulse energy Et received from the laser machining processor 310 becomes smaller than an allowable range after laser oscillation is started, and to open when a signal indicating the light emission trigger Tr is received from the laser machining processor 310. After the difference ΔE becomes smaller than the allowable range, the laser processor 190 transmits, to the laser machining processor 310, a reception preparation complete signal notifying that preparation for reception of the light emission trigger Tr is completed. The light emission trigger Tr is defined with a predetermined repetition frequency f and a predetermined pulse number P of a pulse laser beam, is a timing signal with which the laser machining processor 310 causes the master oscillator 130 to perform laser oscillation, and is an external trigger. The repetition frequency f of a pulse laser beam is, for example, 1 kHz to 10 kHz inclusive.

The internal spaces of the optical path pipes 171 and 147*a* and the internal spaces of the housings 151 and 145*a* are filled with purge gas. The purge gas contains inert gas such as high-purity nitrogen with a small amount of impurity such as oxygen. The purge gas is supplied from a non-illustrated purge gas supply source disposed outside the gas laser apparatus 100 to the internal spaces of the optical path pipes 171 and 147*a* and the internal spaces of the housings 151 and 145*a* through a non-illustrated pipe.

A non-illustrated exhaust device for exhausting the laser gas exhausted from the internal space of the laser chamber 131 is disposed in the internal space of the housing 110 of the gas laser apparatus 100. The exhaust device performs processing of removing $F_2$ gas through a halogen filter from the gas exhausted from the internal space of the laser chamber 131 and discharges the gas to the housing of the gas laser apparatus 100.

The laser machining apparatus 300 includes the laser machining processor 310, an optical system 330, a table 351, a movement stage 353, a housing 355, and a frame 357 as main components. The optical system 330, the table 351, and the movement stage 353 are disposed in the internal space of the housing 355. The housing 355 is fixed to the frame 357. An opening is formed through the housing 355 and connected to the optical path pipe 500. Accordingly, the internal space of the housing 355 communicates with the internal space of the optical path pipe 500.

The laser machining processor 310 is a processing device including a storage device 310*a* in which a control program is stored and a CPU 310*b* configured to execute the control program. The laser machining processor 310 is specially configured or programmed to execute various kinds of processing included in the present disclosure. The laser machining processor 310 controls some components of the laser machining apparatus 300. The laser machining processor 310 controls the entire laser machining apparatus 300.

The optical system 330 includes high reflectance mirrors 331*a*, 331*b*, and 331*c*, an attenuator 333, a mask 335, and a transfer optical system 337. The high reflectance mirrors 331*a*, 331*b*, and 331*c*, the attenuator 333, the mask 335, and the transfer optical system 337 are each fixed to a non-illustrated holder and disposed at a predetermined position in the housing 355.

The high reflectance mirrors 331*a*, 331*b*, and 331*c* reflect a pulse laser beam at high reflectance. The high reflectance mirrors 331*a*, 331*b*, and 331*c* each have a configuration in which the surface of a transparent substrate formed of, for example, synthetic quartz or calcium fluoride is coated with a reflective film that highly reflects a pulse laser beam. The high reflectance mirror 331*a* reflects a pulse laser beam incident from the gas laser apparatus 100 toward the attenuator 333. The high reflectance mirror 331*b* reflects the pulse laser beam from the attenuator 333 toward the high reflectance mirror 331*c*. The high reflectance mirror 331*c* reflects the pulse laser beam toward the transfer optical system 337.

The attenuator 333 is disposed on the optical path between the high reflectance mirrors 331*a* and 331*b*. The attenuator 333 includes, for example, rotation stages 333*a* and 333*b*, and partially reflective mirrors 333*c* and 333*d* fixed to the rotation stages 333*a* and 333*b*. The rotation stages 333*a* and 333*b* are electrically connected to the laser machining processor 310 and rotate about the Y axis in accordance with a control signal from the laser machining processor 310. The partially reflective mirrors 333*c* and 333*d* rotate as the rotation stages 333*a* and 333*b* rotate. The partially reflective mirrors 333*c* and 333*d* are optical elements having transmittance that changes with the incident angle of a pulse laser beam on the partially reflective mirrors 333*c* and 333*d*. The rotation angles of the partially reflective mirrors 333*c* and 333*d* about the Y axis are adjusted through rotation of the rotation stages 333*a* and 333*b* so that the incident angle of a pulse laser beam matches between the mirrors and desired transmittance of the partially reflective mirrors 333*c* and 333*d* is obtained. Accordingly, a pulse laser beam from the high reflectance mirror 331*a* is dimmed to desired pulse energy and passes through the attenuator 333.

The mask 335 is disposed between the high reflectance mirrors 331*b* and 331*c*. The mask 335 is constituted by, for example, a circular transmission hole through which part of a pulse laser beam transmits, and a light-shielding plate at which the transmission hole is positioned and that shields the other part of the pulse laser beam. The shape of the transmission hole is not limited. The mask 335 includes a change mechanism capable of changing the size of the transmission hole and can adjust the size of the transmission hole in accordance with the size of a machined portion to be formed on the machining object 20. A transfer pattern corresponding to the machined portion is formed as a pulse laser beam transmits through the transmission hole. The machined portion having a circular section is formed on the machining object 20 as the transfer pattern is transferred to the machining object 20.

The transfer optical system 337 condenses the pulse laser beam onto the machining object 20 so that the transfer pattern forms an image at an imaging position at a predetermined depth ΔZsf from the front surface side of the machining object 20. The transfer optical system 337 is constituted by a plurality of lenses in combination. The transfer optical system 337 is a reduction optical system through which the circular transfer pattern having a dimension smaller than the dimension of the transmission hole of the mask 335 is imaged at the imaging position. The magnification of the transfer optical system 337 is, for example, 1/10 to 1/5. Although the transfer optical system 337 is constituted by combined lenses in the above-described example, the transfer optical system 337 may be constituted by a single lens when one small circular transfer pattern is to be imaged near the optical axis of the transfer optical system 337.

The table 351 supports the machining object 20. The table 351 has a principal surface positioned substantially orthogonal to the Z axis and substantially along the XY plane. Accordingly, the front and back surfaces of the machining object 20 are positioned substantially orthogonal to the Z axis and substantially along the XY plane.

The machining object 20 is a target object to be subjected to laser machining through irradiation with a pulse laser beam. The machining object 20 is, for example, quartz glass. Examples of the machining object 20 include a material containing carbon atoms, an organic material such as polyimide or fluorine series resin, a composite material (carbon fiber reinforced plastics (CFRP)) of carbon fiber and resin, and diamond. Further examples of the machining object 20 include a wide-bandgap material such as sapphire or SiC (silicon carbide), and a transparent material such as $CaF_2$ crystal, $MgF_2$ crystal, and a glass material.

The movement stage 353 is disposed on the bottom surface of the housing 355 and supports the table 351. The movement stage 353 is movable in the X, Y, and Z directions and can adjust the position of the table 351 through movement. The movement stage 353 thus configured can adjust the position of the machining object 20 by moving the machining object 20 through the table 351 so that the machining object 20 is irradiated with a pulse laser beam output from the optical system 330.

Nitrogen ($N_2$) gas that is inert gas always flows to the internal space of the housing 355 while the laser machining system 10 is in operation. The housing 355 is provided with an intake port 355*a* through which the nitrogen gas is taken into the housing 355, and a discharge port 355*b* through which the nitrogen gas is externally discharged from the housing 355. The intake port 355*a* and the discharge port 355*b* can be connected to a non-illustrated intake pipe and a non-illustrated discharge pipe. The intake port 355*a* and the discharge port 355*b* being connected to the intake pipe and the discharge pipe are sealed by non-illustrated O rings to prevent mixture of external air into the housing 355. The intake port 355*a* is also connected to a nitrogen gas supply source 363. The housing 355 prevents impurity mixture into the internal space of the housing 355 in which the machining object 20 is disposed. The nitrogen gas also flows to the optical path pipe 500 communicating with the housing 355. The optical path pipe 500 is sealed by O rings at a connection part to the gas laser apparatus 100 and at a connection part to the laser machining apparatus 300.

Figure 2:
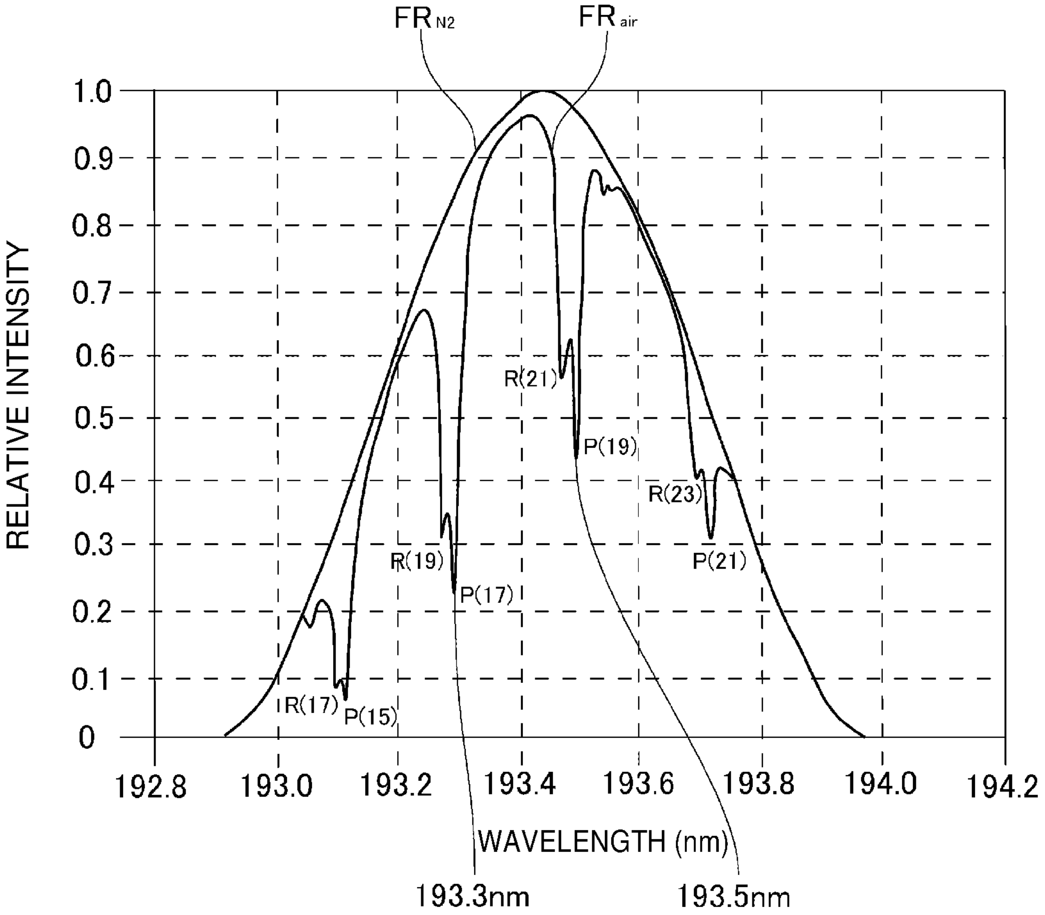
FIG. 2 is a diagram illustrating the spectrum waveform of a laser beam in spontaneous oscillation and light absorption by oxygen.

FIG. 2 illustrates a spectrum waveform $FR_{N2}$ of an ArF excimer laser beam in spontaneous oscillation (free running) in nitrogen gas containing no oxygen. The spectrum waveform $FR_{N2}$ has a central wavelength of substantially 193.40 nm and has a spectrum line width of approximately 450 pm for full width at half maximum (FWHM). It is known that oxygen has a plurality of absorption lines as an absorption band in which a pulse laser beam is absorbed. If part of the spectrum waveform $FR_{N2}$ overlaps an absorption line of oxygen in gas containing oxygen, for example, in air, a part of a pulse laser beam is absorbed by oxygen at the overlapping part. Accordingly, ozone is generated from oxygen and absorbs other part of the pulse laser beam. When absorption of the pulse laser beam occurs, a spectrum waveform $FR_{air}$ corresponding to the overlapping of the spectrum waveform $FR_{N2}$ and an absorption line of oxygen has drops of light intensity I at a plurality of absorption lines unlike the spectrum waveform $FR_{N2}$. Relative intensity on the vertical axis in FIG. 2 is a value obtained by normalizing the light intensity I.

For example, as disclosed in Japanese Unexamined Patent Application Publication No. 3-157917, absorption lines at wavelengths of 175 nm to 250 nm are attributable to absorption transition in Schumann-Runge bands and correspond to absorption bands expressed as branches R(17), P(15), R(19), P(17), P(19), R(21), P(21), and R(23). As illustrated in FIG. 2, the spectrum waveform $FR_{air}$ of an ArF excimer laser beam has drops of the light intensity I at absorption lines corresponding to these branches.

As described above, when the wavelength of a pulse laser beam overlaps an absorption line of oxygen in the atmosphere, the intensity of the pulse laser beam decreases and the machining object 20 is potentially not appropriately machined. However, in the comparative example, nitrogen gas flows into the internal space of the housing 355, oxygen is discharged from the housing 355, and overlapping of the wavelength of the pulse laser beam with an absorption line of oxygen is prevented. Accordingly, ozone generation, absorption of the pulse laser beam by ozone, and decrease of the intensity of the pulse laser beam due to the absorption are prevented.

2.2 Operation

Operation of the laser machining system 10 of the comparative example will be described below.

In the gas laser apparatus 100, the internal spaces of the optical path pipes 147*a*, 171, and 500 and the internal spaces of the housings 145*a* and 151 are filled with purge gas from the non-illustrated purge gas supply source before the gas laser apparatus 100 outputs a laser beam. The internal space of the laser chamber 131 is supplied with laser gas from the non-illustrated laser gas supply source. In the laser machining apparatus 300, nitrogen gas flows in the internal space of the housing 355.

Subsequently, in the laser machining apparatus 300, the machining object 20 is supported by the table 351 of the movement stage 353. The laser machining processor 310 sets, to the movement stage 353, the coordinates X, Y, and Z of an initial irradiation position to be irradiated with a pulse laser beam to form a machined portion. The initial irradiation position is the imaging position at which a transfer pattern is imaged. Accordingly, the movement stage 353 moves to the set initial irradiation position.

After the movement of the movement stage 353 ends, the laser machining processor 310 controls the gas laser apparatus 100 so that a pulse laser beam with which the machining object 20 is to be irradiated has a desired fluence Fm necessary for laser machining. In the control of the gas laser apparatus 100, the laser machining processor 310 first reads the target pulse energy Et stored in the laser machining processor 310. The target pulse energy Et is a target value of pulse energy necessary for laser machining. Subsequently, the laser machining processor 310 transmits a signal indicating the read target pulse energy Et to the laser processor 190 of the gas laser apparatus 100. Having received the signal indicating the target pulse energy Et, the laser processor 190 sets the target pulse energy Et as pulse energy Em necessary for laser machining. The target pulse energy Et may be stored in the storage device 190*a* of the laser processor 190.

Fluence F is energy density of a pulse laser beam on the front surface of the machining object 20 to be irradiated with the pulse laser beam and is defined by Expression (1) below when a light loss of the optical system 330 is negligible.

$$F=Et/S\,[\mathrm{mJ/cm^2}] \tag{1}$$

In Expression (1), S represents the irradiation area of the pulse laser beam on the front surface of the machining object 20 and is $\pi(D/2)^2$ [$cm^2$] where D represents the diameter of an irradiation spot of the pulse laser beam on the front surface of the machining object 20.

Thus, the fluence Fm necessary for laser machining is defined by Expression (2) below based on Expression (1), where Sm represents the irradiation area of the pulse laser beam at laser machining.

$$Fm=Em/Sm\,[\mathrm{mJ/cm^2}] \tag{2}$$

Thus, the fluence Fm is calculated from the pulse energy Em.

As described above, the laser processor 190 sets the target pulse energy Et as the pulse energy Em when having received the signal indicating the target pulse energy Et. Then, the laser processor 190 closes the shutter 170 and actuates the charger 141 so that pulse energy becomes equal to the pulse energy Em. In addition, the laser processor 190 turns on the switch 143*a* of the pulse power module 143 with a non-illustrated internal trigger. Accordingly, the pulse power module 143 generates high voltage in pulses from electric energy held in the charger 141, and the high voltage is applied between the electrodes 133*a* and 133*b*. When the high voltage is applied between the electrodes 133*a* and 133*b*, insulation between the electrodes 133*a* and 133*b* breaks down and discharge occurs. A laser medium contained in the laser gas between the electrodes 133*a* and 133*b* is excited by energy of the discharge and then discharges spontaneously emitted light when returning to the ground state. Part of the light is ultraviolet light and transmits through the window 139*a*. The transmitting light is reflected by the rear mirror 145. The light reflected by the rear mirror 145 propagates to the internal space of the laser chamber 131 through the window 139*a* again. The light propagating to the internal space of the laser chamber 131 travels to the output coupling mirror 147 through the window 139*b*. Part of the light transmits through the output coupling mirror 147 and the beam splitter 153 and is shielded by the shutter 170, and the other part of the light is reflected by the output coupling mirror 147 and propagates to the internal space of the laser chamber 131 through the window 139*b*. The light having propagated to the internal space of the laser chamber 131 travels to the rear mirror 145 through the window 139*a* as described above. In this manner, light of a predetermined wavelength reciprocates between the rear mirror 145 and the output coupling mirror 147. The light is amplified each time the light passes through a discharge space in the internal space of the laser chamber 131, and laser oscillation occurs. Then, part of the laser beam travels as a pulse laser beam to the beam splitter 153 through the output coupling mirror 147.

Part of the pulse laser beam having travelled to the beam splitter 153 is reflected by the beam splitter 153. The reflected pulse laser beam is received by the optical sensor 155, and the optical sensor 155 measures the pulse energy E of the received pulse laser beam. The optical sensor 155 outputs a signal indicating data of the measured pulse energy E to the laser processor 190. The laser processor 190 controls the charging voltage of the charger 141 so that the difference ΔE between the pulse energy E and the target pulse energy Et approaches zero. Specifically, the laser processor 190 controls the charging voltage so that the difference ΔE becomes smaller than an allowable range. After the difference ΔE becomes smaller than the allowable range, the laser processor 190 transmits, to the laser machining processor 310, a reception preparation complete signal notifying that preparation for reception of the light emission trigger Tr for the pulse laser beam is completed.

Having received the reception preparation complete signal, the laser machining processor 310 controls transmittance Tm of the attenuator 333 so that the pulse laser beam with which the machining object 20 is to be irradiated has the fluence Fm necessary for laser machining.

The transmittance Tm is defined by Expression (3) below when the optical system 330 has no light loss.

$$Tm=\pi(D/2)^2(F/Et) \tag{3}$$

Thus, the transmittance Tm at laser machining is defined by Expression (4) below where D represents the diameter of an irradiation spot of the pulse laser beam on the front surface of the machining object 20 at laser machining.

$$Tm=\pi(D/2)^2(Fm/Em) \tag{4}$$

When the pulse energy Em and the transmittance Tm are controlled as described above, the laser machining processor 310 transmits the light emission trigger Tr to the laser processor 190. As a result, the laser processor 190 opens the shutter 170 in synchronization with reception of the light emission trigger Tr, and accordingly, the pulse laser beam passing through the shutter 170 is incident on the laser machining apparatus 300. The pulse laser beam is an ArF laser beam that is ultraviolet light having a central wavelength of 193.4 nm.

The pulse laser beam incident on the laser machining apparatus 300 travels to the transfer optical system 337 through the high reflectance mirror 331*a*, the attenuator 333, the high reflectance mirror 331*b*, the mask 335, and the high reflectance mirror 331*c*. The pulse laser beam having transmitted through the transfer optical system 337 images a transfer pattern at the imaging position. The machining object 20 is irradiated with the pulse laser beam in accordance with the light emission trigger Tr defined with the repetition frequency f and the pulse number P that are necessary for laser machining. As the irradiation with the pulse laser beam continues, ablation occurs and a flaw occurs near the front surface of the machining object 20. Accordingly, a machined portion is formed on the machining object 20.

When another machined portion is to be formed after the machined portion is formed, the laser machining processor

310 sets, to the movement stage 353, the coordinates X, Y, and Z of an initial irradiation position to be irradiated with a pulse laser beam to form the other machined portion. Accordingly, the movement stage 353 moves to the set initial irradiation position. Laser machining is performed on the machining object 20 at the coordinates. Laser machining ends when no other machined portion is to be formed. Such a procedure is repeated until laser machining ends at all machined portions.

2.3 Problem

In the laser machining apparatus 300 of the comparative example, a loss of a pulse laser beam occurs due to the mask 335 unlike a case in which the mask 335 is not used. When the loss occurs, the energy density of a pulse laser beam with which a machining area of the machining object 20 is irradiated decreases. When the energy density decreases, it is potentially difficult to form a machined portion in a case in which the machining object 20 is hard.

Thus, the laser machining system 10 and a laser machining method that can easily form a machined portion on the machining object 20 are exemplarily described in embodiments below. The machined portion is a through-hole in the embodiments. Moreover, the machining object 20 may be a ceramic matrix composite (CMC) in the embodiments.

3. Description of Laser Machining System and Laser Machining Method of Embodiment 1

The laser machining system 10 and laser machining method of Embodiment 1 will be described below. Any component identical to a component described above is denoted by the same reference sign, and duplicate description thereof is omitted unless otherwise stated.

3.1 Configuration

Figure 3:
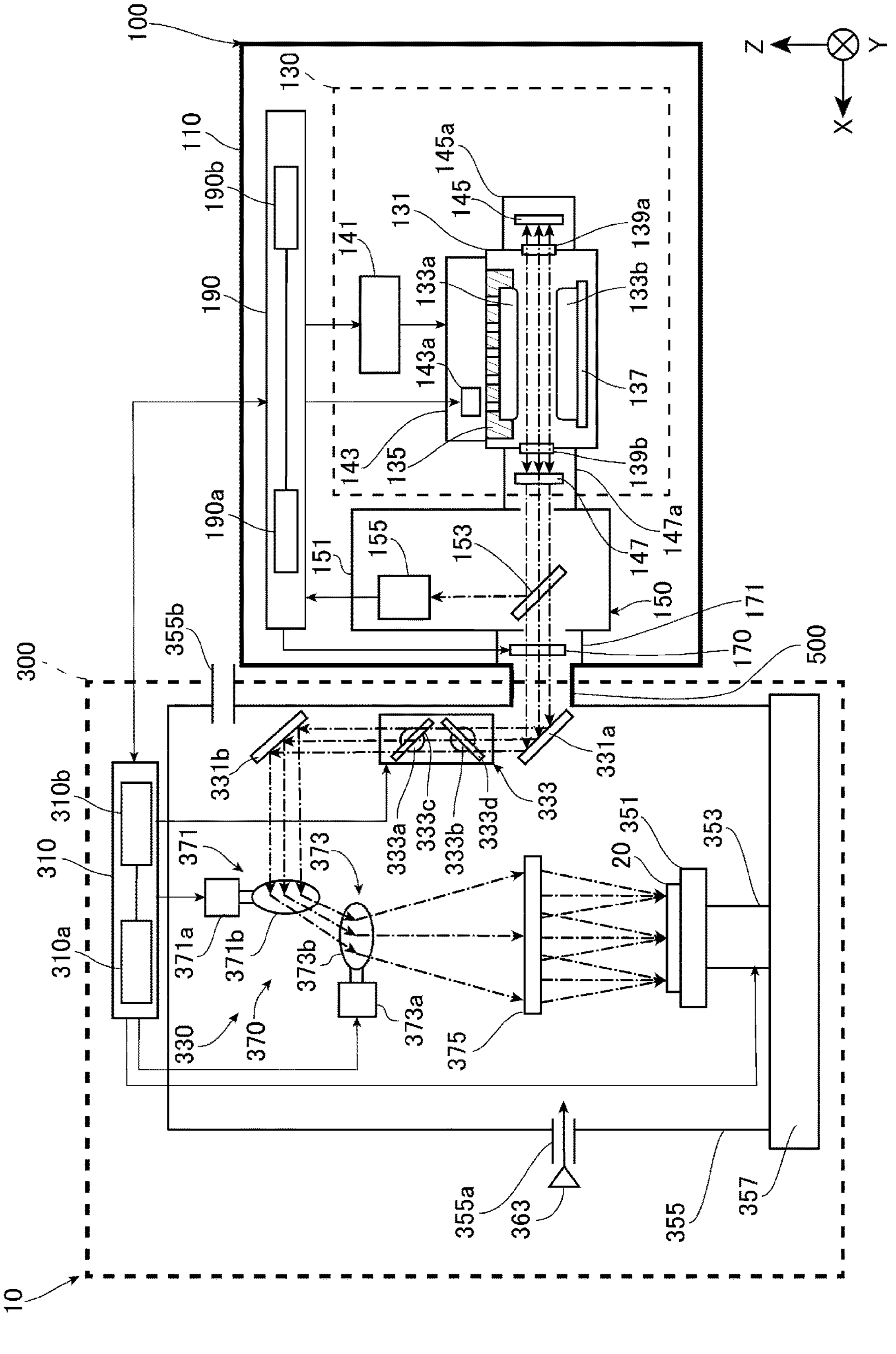
FIG. 3 is a schematic diagram illustrating an example of the entire schematic configuration of a laser machining system of Embodiment 1.

FIG. 3 is a schematic diagram illustrating an example of the entire schematic configuration of the laser machining system 10 of the present embodiment. In the laser machining system 10 of the present embodiment, the gas laser apparatus 100 and the optical path pipe 500 have the same configurations as the gas laser apparatus 100 and the optical path pipe 500 of the comparative example. The laser machining apparatus 300 of the present embodiment has a configuration different from the configuration of the laser machining apparatus 300 of the comparative example. Specifically, in the optical system 330 of the laser machining apparatus 300 of the present embodiment, the high reflectance mirror 331*c*, the mask 335, and the transfer optical system 337 are not disposed in the internal space of the housing 355, but an irradiation optical system 370 and an fθ lens 375 are disposed in the internal space of the housing 355.

The irradiation optical system 370 guides, to part of the machining area, a pulse laser beam output from the gas laser apparatus 100 that is an excimer laser apparatus, and irradiates the entire range of the machining area with the pulse laser beam by moving the guided pulse laser beam to irradiation spots in the in-plane direction of a projection plane in the machining area. The projection plane is a plane positioned on the XY plane when the machining area is viewed in a direction opposite the traveling direction of the pulse laser beam to the machining area. In other words, the projection plane is a plane positioned on the XY plane when the machining area is viewed in the Z direction from the back surface of the machining object 20 toward the front surface of the machining object 20. The front surface of the machining object 20 of the present embodiment is substantially orthogonal to the Z axis, and the plane direction of the machining area is substantially perpendicular to the optical axis of the pulse laser beam. Accordingly, the projection plane is substantially parallel to and positioned facing the machining area, and the in-plane direction of the projection plane is the in-plane direction of the machining area and orthogonal to the height direction. The pulse laser beam moves on the XY plane in irradiation with the pulse laser beam in the present embodiment. Examples of such movement include movement of the pulse laser beam in up-down and right-left directions on the XY plane as described later for raster scanning machining as overall machining to be described later, and movement of the pulse laser beam drawing a circle on the XY plane as described later for helium-cadmium machining as overall machining. The irradiation optical system 370 includes Galvano scanners 371 and 373.

The Galvano scanner 371 includes a drive unit 371*a* and a mirror 371*b* that is attached to a swing shaft of the drive unit 371*a* and can swing about the swing shaft. The Galvano scanner 373 has the same configuration as the Galvano scanner 371 and includes a drive unit 373*a* and a mirror 373*b* that is attached to a swing shaft of the drive unit 373*a* and can swing about the swing shaft.

The drive units 371*a* and 373*a* are each a motor or the like and electrically connected to the laser machining processor 310. The swing speed and swing angle of the swing shaft of each of the drive units 371*a* and 373*a* are controlled by a control signal from the laser machining processor 310. The swing shaft of the drive unit 371*a* is orthogonal to the swing shaft of the drive unit 373*a*.

The mirror 371*b* reflects the pulse laser beam from the high reflectance mirror 331*b* toward the mirror 373*b*. The mirror 373*b* reflects the pulse laser beam from the mirror 371*b* toward the fθ lens 375. The mirrors 371*b* and 373*b* do not shield the pulse laser beam unlike the mask 335, and thus generation of a loss of the pulse laser beam is reduced as compared to a configuration in which the mask 335 is provided instead. The orientations of the mirrors 371*b* and 373*b* are adjusted by the swing angles of the swing shafts of the drive units 371*a* and 373*a*. Adjustment of the orientation of the mirror 371*b* may be synchronized with adjustment of the orientation of the mirror 373*b*. The swing speeds of the mirrors 371*b* and 373*b* are adjusted by the swing speeds of the swing shafts of the drive units 371*a* and 373*a*.

The Galvano scanners 371 and 373 irradiate the front surface of the machining object 20 with the pulse laser beam by using the mirrors 371*b* and 373*b* while moving the pulse laser beam in the X and Y directions, thereby performing overall machining on the machining object 20 to form a machined portion thereon through the movement and irradiation. The overall machining will be described later. In the movement and irradiation, the interval between irradiation lines of the pulse laser beam with which the machining object 20 is irradiated and the moving speed thereof are controlled by the orientations and speeds of the mirrors 371*b* and 373*b*. The irradiation lines are lines along which the pulse laser beam moves through irradiation spots in the machining area of the machining object 20.

The fθ lens 375 is disposed on the optical path between the mirror 373*b* and the machining object 20. The optical axis of the fθ lens 375 is aligned with the Z direction. Through the fθ lens 375, the pulse laser beam from the Galvano scanner 373 is incident on the machining area on the front surface of the machining object 20 along the optical axis of the fθ lens 375 while condensing to the machining area. Since the front surface of the machining object 20 of the present embodiment is substantially orthogonal to the Z axis, the pulse laser beam is substantially perpendicularly incident on the machining area. The fθ lens 375 condenses the pulse laser beam to the machining area such that the diameter of each irradiation spot of the pulse laser beam in the machining area is smaller than the diameter of a machined portion.

The irradiation spot diameter is preferably, for example, 30 μm to 2 mm inclusive. The pulse energy Em of the pulse laser beam is preferably, for example, 0.1 mJ to 30 mJ inclusive. The laser machining processor 310 controls the interval of irradiation lines of the pulse laser beam and the moving speed of the pulse laser beam by controlling the swing angles and swing speeds of the swing shafts of the drive units 371*a* and 373*a* so that the amount of the difference between one irradiation spot and another irradiation spot adjacent to the irradiation spot is 0.5% to 100% inclusive of the irradiation spot diameter. When the amount of the difference is 0.5%, the adjacent irradiation spots substantially overlap each other. When the amount of the difference is 100%, outer edges of the adjacent irradiation spots overlap each other. In this manner, at least part of each irradiation spot of the pulse laser beam with which the machining object 20 is irradiated overlaps another irradiation spot adjacent to the irradiation spot.

The overall machining will be described below.

The overall machining is a type of machining in which movement and irradiation of/with the pulse laser beam are performed over the entire range of the machining area in the in-plane direction like filling a blank space. In the overall machining, ablation occurs and a flaw occurs in the machining area through movement and irradiation of/with the pulse laser beam in the X and Y directions. Subsequently, the movement stage 353 moves in the Z direction, and ablation occurs and a flaw occurs at each height position to which the movement stage 353 has moved through the overall machining conducted at each height position to which the movement stage 353 has moved. Accordingly, a machined portion is formed. The pulse laser beam used in the overall machining has an irradiation spot diameter smaller than the hole diameter of the machined portion in the machining area. In the overall machining of the present embodiment, since the mirrors 371*b* and 373*b* do not shield the pulse laser beam unlike the mask 335, decrease of the energy density of the pulse laser beam with which the machining area is irradiated is reduced as compared to a configuration in which the mask 335 is provided instead. Movement and irradiation of/with the pulse laser beam in the overall machining may be performed over at least part of the entire range of the machining area in the in-plane direction like filling a blank space.

Examples of the overall machining include helium-cadmium machining and raster scanning machining. Each machining will be described below.

Figure 4:
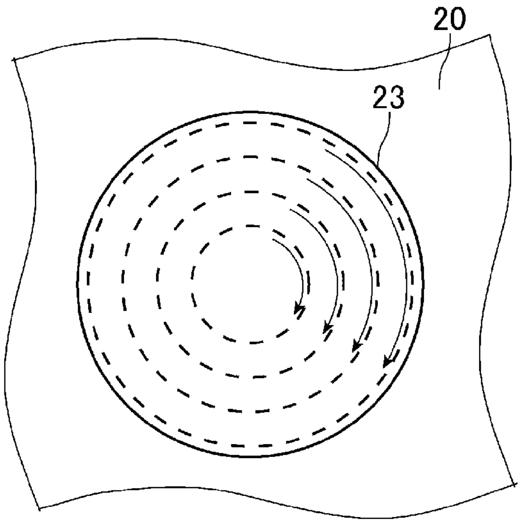
FIG. 4 is a diagram for description of helium-cadmium machining.

FIG. 4 is a diagram for description of the helium-cadmium machining. FIG. 4 is a diagram of a machining area 23 of the machining object 20 when viewed from the fθ lens 375 side. Dashed lines illustrated in FIG. 4 represent a plurality of circular irradiation lines substantially concentrically positioned at constant intervals in the machining area 23, and each irradiation line is irradiated with the pulse laser beam in the helium-cadmium machining. To clearly indicate a circular irradiation line positioned outermost in FIG. 4, the irradiation line is illustrated at a position shifted on the inner side of the machining area 23. The inner side of the irradiation line is the machining area 23. Each arrow illustrated in FIG. 4 represents the traveling direction of the pulse laser beam with which the corresponding irradiation line is irradiated. In the helium-cadmium machining, after at least one round of movement and irradiation of/with the pulse laser beam along the outermost irradiation line, at least one round of movement and irradiation of/with the pulse laser beam is performed along an inner irradiation line closest to the outermost irradiation line. Movement and irradiation of/with the pulse laser beam are sequentially performed along irradiation lines positioned further on the inner side and lastly performed along the innermost irradiation line. Thus, the pulse laser beam moves to irradiation spots in the in-plane direction of the projection plane in the machining area 23, and accordingly, the entire range of the machining area 23 is irradiated. In the irradiation, at least part of each irradiation spot of the pulse laser beam overlaps another irradiation spot adjacent to the irradiation spot. Such adjacent irradiation spots are adjacent to each other in the circumferential and radial directions of the irradiation lines. Movement and irradiation of/with the pulse laser beam may be sequentially performed along the irradiation lines from the innermost irradiation line toward the outermost irradiation line. The number of times of irradiation along each irradiation line may be equal or different among the irradiation lines. For example, the number of times of irradiation may be larger or smaller for irradiation lines further on the inner side.

Figure 5:
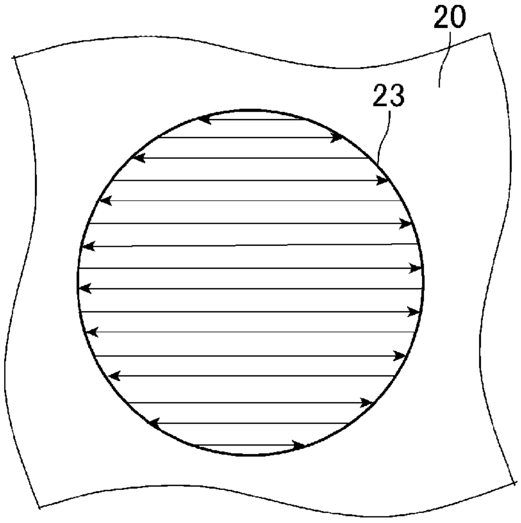
FIG. 5 is a diagram for description of raster scanning machining.

FIG. 5 is a diagram for description of the raster scanning machining. FIG. 5 is a diagram of the machining area 23 when viewed from the fθ lens 375 side. In the raster scanning machining, movement and irradiation of/with the pulse laser beam are performed straight in the right-left direction from the lower end of the machining area 23 toward the upper end thereof. Each arrow illustrated in FIG. 5 represents the traveling direction of the pulse laser beam with which the corresponding irradiation line is irradiated. To clearly indicate the pulse laser beam with which the lowermost and uppermost irradiation lines are irradiated in FIG. 5, the pulse laser beam is illustrated at a position shifted on the inner side of the machining area 23. The area between the irradiation lines is the machining area 23. In the raster scanning machining, after movement and irradiation of/with the pulse laser beam from left to right along the lowermost irradiation line, movement and irradiation of/with the pulse laser beam are performed from right to left along an upper irradiation line closest to the lowermost irradiation line. Subsequently, movement and irradiation of/with the pulse laser beam are performed from left to right along an upper irradiation line closest to the second lowermost irradiation line. Movement and irradiation of/with the pulse laser beam are sequentially performed along irradiation lines positioned further on the upper side through repetitions from left to right and from right to left and lastly performed along the uppermost irradiation line. Thus, the pulse laser beam moves through irradiation spots in the in-plane direction of the projection plane in the machining area 23, and accordingly, the entire range of the machining area 23 is irradiated. In the irradiation, at least part of each irradiation spot of the pulse laser beam overlaps another irradiation spot adjacent to the irradiation spot. Such adjacent irradiation spots are adjacent to each other in the right-left and up-down directions of the irradiation lines. Movement and irradiation of/with the pulse laser beam may be sequentially performed along the irradiation lines in the reverse order from the uppermost irradiation line toward the lowermost irradiation line. Alternatively, movement and irradiation of/with the pulse laser beam may be vertically performed along irradiation lines from the left end of the machining area 23 toward the right end thereof or from the right end toward the left end.

3.2 Operation

Operation of the laser machining processor 310 in the present embodiment will be described below.

Figure 6:
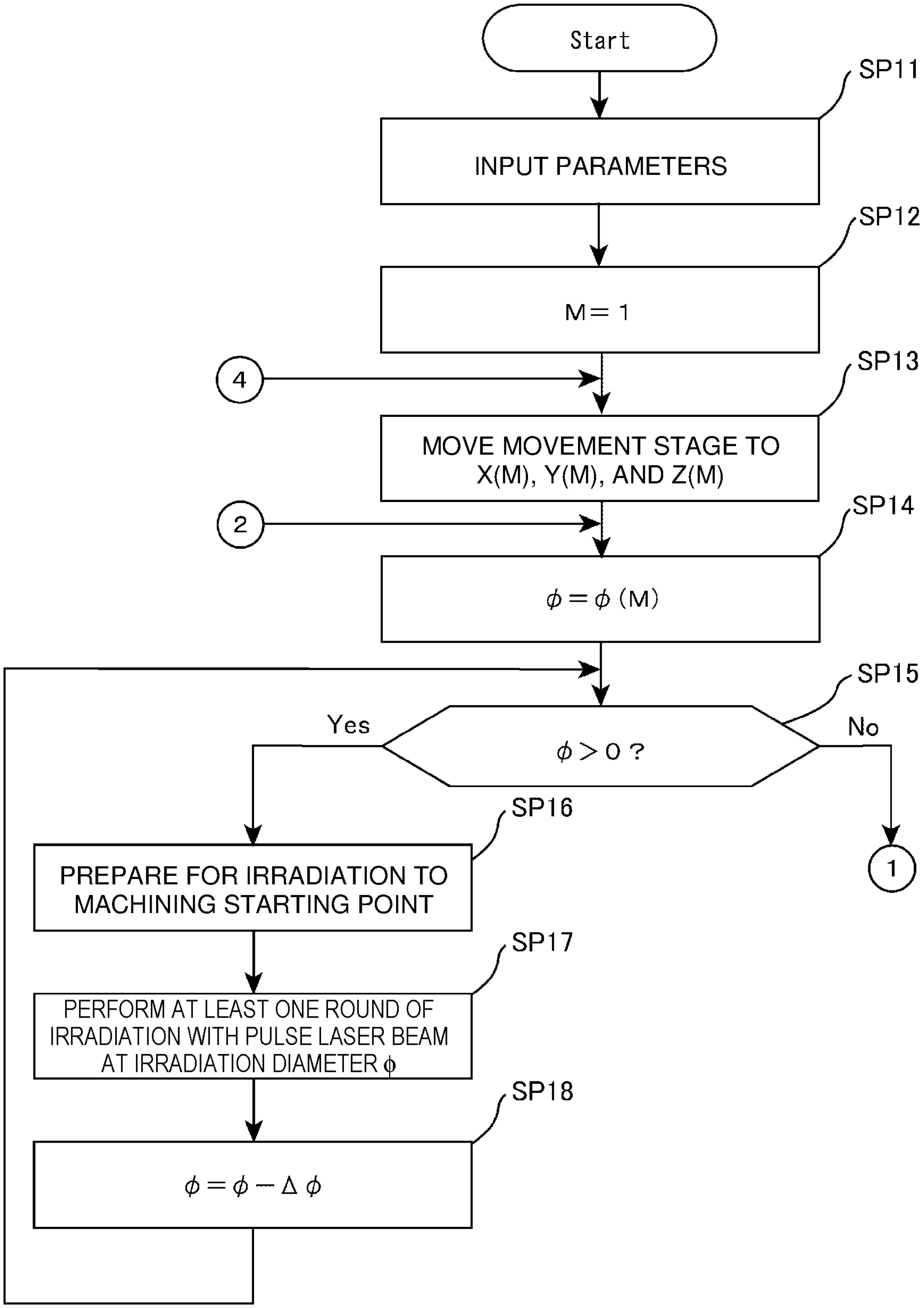
FIG. 6 is a diagram illustrating a part of a flowchart of control by a laser machining processor of Embodiment 1.
Figure 7:
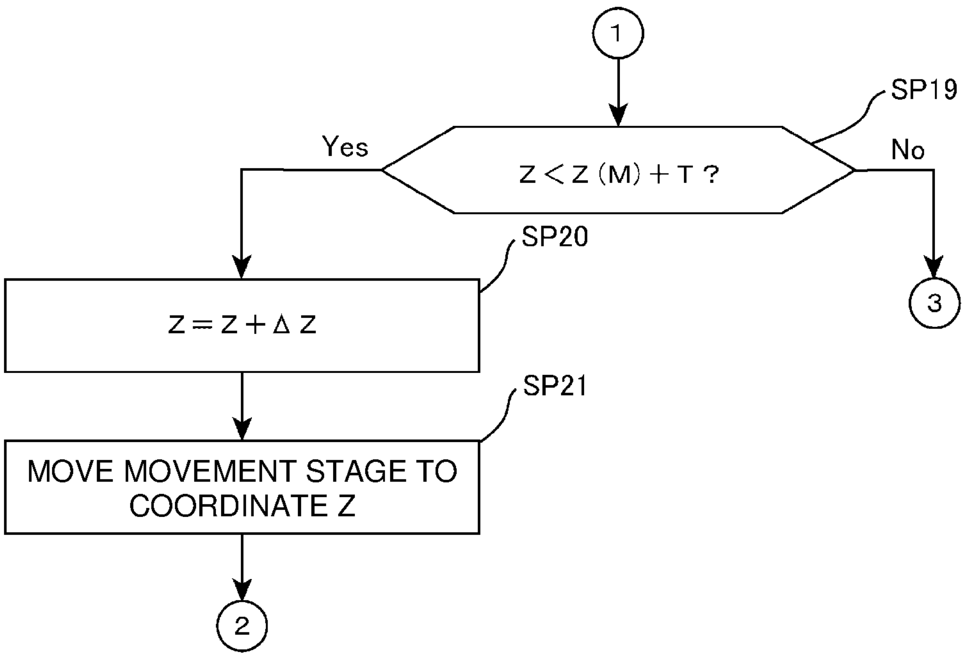
FIG. 7 is a diagram illustrating another part of the flowchart of control by the laser machining processor of Embodiment 1.
Figure 8:
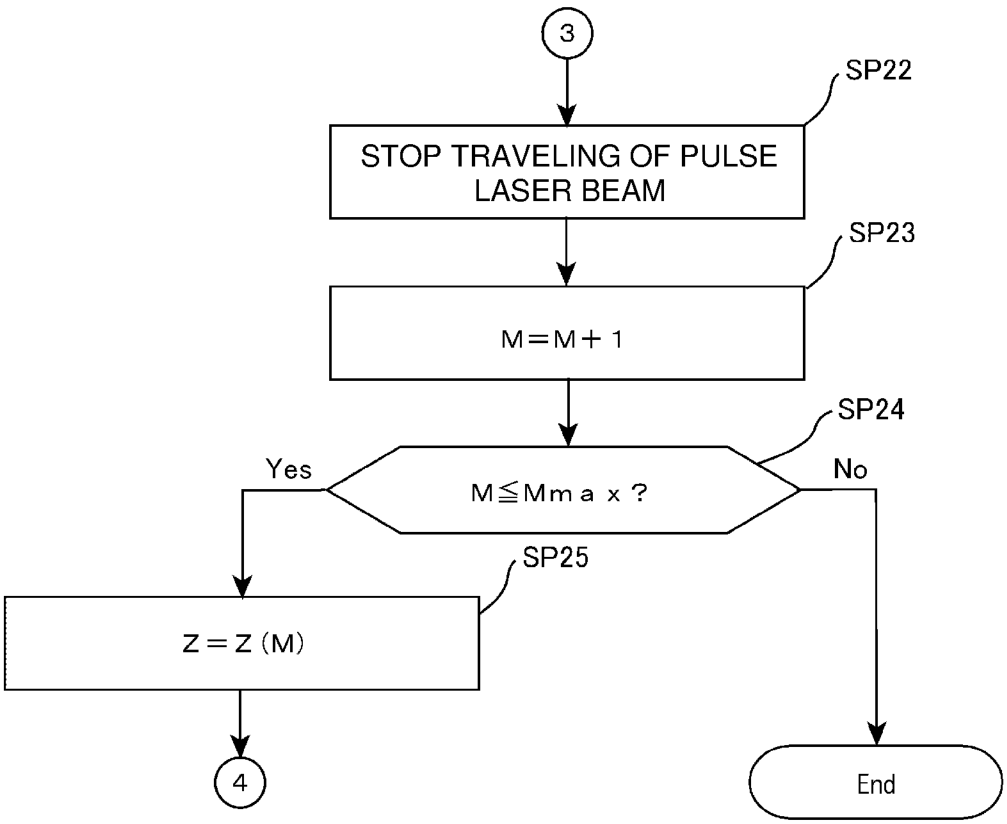
FIG. 8 is a diagram illustrating the remaining part of the flowchart of control by the laser machining processor of Embodiment 1.

FIG. 6 is a diagram illustrating a part of a flowchart of control by the laser machining processor 310 of the present embodiment. FIG. 7 is a diagram illustrating another part of the control flowchart. FIG. 8 is a diagram illustrating the remaining part of the control flowchart. The flowchart of control of the present embodiment includes steps SP11 to SP25 and illustrates a laser machining method of forming a machined portion in the machining area. In the flowchart of control described below, the laser machining method employs the helium-cadmium machining in which movement and irradiation of/with the pulse laser beam are sequentially performed along irradiation lines from the outermost irradiation line toward the innermost irradiation line.

In a start state illustrated in FIG. 6, the machining object 20 is supported on the movement stage 353. The laser machining processor 310 has already received the reception preparation complete signal from the laser processor 190. The shutter 170 is closed, and the pulse laser beam is yet to be output from the gas laser apparatus 100 and incident on the laser machining apparatus 300.

Step SP11

In the present step, parameters are input from a non-illustrated input unit to the storage device 310*a* of the laser machining processor 310. The parameters are, for example, a machining number M allocated to each machining area forming a machined portion on the machining object 20, a machining number Mmax that is the maximum number of the machining number M, position data of an initial irradiation position to be first irradiated with the pulse laser beam in each machining area to form the corresponding machined portion, a thickness T of the machining object 20, an irradiation diameter $\phi(M)$ of the pulse laser beam, a change rate $\Delta\phi$ of the irradiation diameter $\phi(M)$, and a change rate $\Delta Z$ of the coordinate Z to be described later. For example, when there are three machined portions, machining numbers M1, M2, and M3 are allocated to the respective machining areas of the three machined portions, and the machining number Mmax is three. The machined portions are discontinuously formed. Accordingly, the machining areas in which the respective machined portions are formed are discontinuously positioned. The number of machined portions is three in the above-described example but may be other than three. Each initial irradiation position is an initial value indicating a position to be first irradiated with the pulse laser beam in the corresponding machining area and is a machining starting point in the machining area. The position data of each initial irradiation position includes coordinates X(M), Y(M), and Z(M) of the initial irradiation position and is set for the corresponding machining area. The coordinates X(M) and Y(M) may correspond to the central position of the machining area. The irradiation diameter $\phi(M)$ will be described later.

The parameters may be input to a storage device different from the storage device 310*a* of the laser machining processor 310. The storage device is provided outside the laser machining processor 310 and electrically connected to the laser machining processor 310. The storage device is, for example, a non-transitory recording medium and preferably a semiconductor recording medium such as a random access memory (RAM) or a read only memory (ROM), but may include a recording medium in an optional format such as an optical recording medium or a magnetic recording medium. The "non-transitory" recording medium includes all computer-readable recording media except for transitory, propagating signals but does not exclude volatile recording media.

The input unit is operated by, for example, an operator who operates the laser machining system 10. The input unit is a typical input instrument and is, for example, a keyboard, a pointing device such as a mouse, a button switch, or a dial. The operator may input, to the input unit, the parameters displayed on a non-illustrated display unit such as a monitor, while viewing the display unit. The input unit may be used by the operator to input various commands for operating the laser machining system 10.

After the parameters are input to the storage device 310*a* of the laser machining processor 310, the laser machining processor 310 advances the control process to step SP12.

Step SP12

In the present step, the laser machining processor 310 sets, to the machining number M1, the first machining number M since the machining object 20 is supported on the movement stage 353. Thus, in the following description, the first machined portion since the machining object 20 is supported on the movement stage 353 is formed in the machining area of the machining number M1, and then, machined portions are sequentially formed in the machining areas of the machining numbers M2 and M3. After having set the machining number M to the machining number M1, the laser machining processor 310 advances the control process to step SP13.

Step SP13

In the present step, the laser machining processor 310 reads, from the storage device 310*a*, the coordinates X(M), Y(M), and Z(M) that are position data of the initial irradiation position in the machining area of the current machining number M, and then moves the movement stage 353 to the coordinates X(M), Y(M), and Z(M). When the coordinates X(M) and Y(M) are in the irradiation ranges of the Galvano scanners 371 and 373, the laser machining processor 310 may move the movement stage 353 only to the coordinate Z(M) without moving the movement stage 353 to the coordinates X(M) and Y(M). After having moved the movement stage 353, the laser machining processor 310 advances the control process to step SP14.

Step SP14

In the present step, the laser machining processor 310 reads the irradiation diameter $\phi(M)$ from the storage device 310*a* and sets an irradiation diameter $\phi$ to the read irradiation diameter $\phi(M)$. The irradiation diameter $\phi(M)$ is the initial value of an irradiation diameter that is the diameter of an irradiation line along which the pulse laser beam moves for the first time since the machining object 20 is supported on the movement stage 353 to perform the helium-cadmium machining in the machining area of the current machining number M. In the present control process in which the helium-cadmium machining is performed, the irradiation diameter $\phi(M)$ is the diameter of the outermost irradiation line. After having set the irradiation diameter $\phi(M)$, the laser machining processor 310 advances the control process to step SP15.

Step SP15

In the present step, when the current irradiation diameter $\phi$ is larger than zero, the laser machining processor 310 advances the control process to step SP16. When the irradiation diameter $\phi$ is equal to or smaller than zero, the laser machining processor 310 advances the control process to step SP19 illustrated in FIG. 7.

Step SP16

In the present step, the laser machining processor 310 controls the orientations of the mirrors 371*b* and 373*b* by controlling drive shafts of the drive units 371*a* and 373*a* of the Galvano scanners 371 and 373 such that the machining starting point in the machining area of the current machining number M is irradiated with the pulse laser beam. The machining starting point is the first irradiation position among the parameters described above at step SP11 and is positioned on the outermost irradiation line described above at step SP14. After having controlled the orientations of the mirrors 371*b* and 373*b*, the laser machining processor 310 transmits the light emission trigger Tr to the laser processor 190. Accordingly, the shutter 170 opens, the pulse laser beam is incident on the laser machining apparatus 300 from the gas laser apparatus 100, and the machining starting point is irradiated. After having transmitted the light emission trigger Tr to the laser processor 190, the laser machining processor 310 advances the control process to step SP17.

Step SP17

In the present step, the laser machining processor 310 controls the tilting speeds and orientations of the mirrors 371*b* and 373*b* through the swing speeds and swing angles of the swing shafts of the drive units 371*a* and 373*a* so that at least one round of movement and irradiation of/with the pulse laser beam is performed at the current irradiation diameter $\phi$ in the machining area of the machining number M. In the present step, the movement stage 353 does not move, and thus the pulse laser beam moves only to irradiation spots in the XY plane during the irradiation, but do not to irradiation spots at different coordinates Z. As described above, the optical axis of the fθ lens 375 is aligned with the Z direction, and the front surface of the machining object 20 is substantially orthogonal to the Z axis. Accordingly, in the present step, the machining area having a plane direction substantially perpendicular to the optical axis of the pulse laser beam is irradiated with the pulse laser beam. After at least one round of movement and irradiation of/with the pulse laser beam, the laser machining processor 310 advances the control process to step SP18.

Step SP18

In the present step, the laser machining processor 310 sets the irradiation diameter $\phi$ to a value obtained by subtracting the irradiation diameter change rate 40 from the current irradiation diameter $\phi$. The change rate $\alpha\phi$ is, for example, the difference between the diameter of the current irradiation line and the diameter of an inner irradiation line closest to the irradiation line and is the interval of two irradiation lines. The set irradiation diameter $\phi$ may be stored in the storage device 310*a*. After having set the irradiation diameter $\phi$, the laser machining processor 310 returns the control process to step SP15.

In this manner, steps SP14 to SP18 are an irradiation process of irradiating the entire range of the machining area with the pulse laser beam by guiding the pulse laser beam output from the gas laser apparatus 100 to part of the machining area and moving the guided pulse laser beam through irradiation spots in the in-plane direction of the projection plane in the machining area. Thus, all irradiation in the machining area is completed when the irradiation process of the present embodiment ends. In the irradiation process, at least part of each irradiation spot of the pulse laser beam overlaps another irradiation spot adjacent to the irradiation spot.

In the helium-cadmium machining at steps SP14 to SP18, at least one round of movement and irradiation of/with the pulse laser beam is sequentially performed along each of a plurality of irradiation lines at a certain coordinate Z from the outermost irradiation line toward the innermost irradiation line among the irradiation lines. After the helium-cadmium machining has been performed at the coordinate Z and the entire range of the machining area at the coordinate Z has been irradiated with the pulse laser beam to achieve overall machining of the entire range of the machining area, the control flowchart proceeds from step SP15 to step SP19 illustrated in FIG. 7.

The laser machining processor 310 may set the irradiation diameter $\phi(M)$ to the diameter of the innermost irradiation line at step SP14 and may set the irradiation diameter $\phi$ to a value obtained by adding the irradiation diameter change rate $\Delta\phi$ to the current irradiation diameter $\phi$ at step SP18. In this case, in the helium-cadmium machining at steps SP14 to SP18, at least one round of movement and irradiation of/with the pulse laser beam is sequentially performed along each of a plurality of irradiation lines at a certain coordinate Z from the innermost irradiation line toward the outermost irradiation line.

Thus, during the helium-cadmium machining at steps SP14 to SP18, at least one round of movement and irradiation of/with the pulse laser beam is performed along one or more irradiation lines of a plurality of concentric irradiation lines in the machining area, and then at least one round of movement and irradiation of/with the pulse laser beam is performed along other one or more irradiation lines of the irradiation lines adjacent to the one or more irradiation lines of the irradiation lines.

The laser machining processor 310 may input the position of the lowermost irradiation line to be irradiated with the pulse laser beam at the machining number M to the Galvano scanners 371 and 373 as the first irradiation line in the machining area of the machining number M at step SP14, and may set the irradiation line to a value obtained by adding an irradiation line change rate to the current irradiation line at step SP18. Accordingly, at steps SP14 to SP18, the raster scanning machining is performed in which movement and irradiation of/with the pulse laser beam are sequentially performed along irradiation lines at a certain coordinate Z from lower irradiation lines toward upper irradiation lines.

Steps SP19 to SP21 will be described below with reference to FIG. 7.

Step SP19

In the present step, the laser machining processor 310 reads the thickness T from the storage device 310*a*. When the current coordinate Z is smaller than the sum of the coordinate Z(M) and the thickness T, the laser machining processor 310 advances the control process to step SP20. When the current coordinate Z is larger than the sum of the coordinate Z(M) and the thickness T, the laser machining processor 310 advances the control process to step SP22 illustrated in FIG. 8.

Step SP20

In the present step, the laser machining processor 310 reads the change rate $\Delta Z$ from the storage device 310*a* and sets the coordinate Z to a value obtained by adding the change rate $\Delta Z$ of the coordinate Z to the current coordinate Z. The set coordinate Z may be stored in the storage device 310*a*. After having set the coordinate Z, the laser machining processor 310 advances the control process to step SP21.

Step SP21

In the present step, the laser machining processor 310 moves the movement stage 353 to the coordinate Z set at step SP20. Thus, the present step is a movement process of moving the machining object 20 in the height direction of the machining object 20. The height direction is a direction along the direction of the optical axis of the pulse laser beam. The moving direction of the machining object 20 is opposite the traveling direction of the pulse laser beam traveling from the fθ lens 375 to the machining object 20. After having moved the movement stage 353, the laser machining processor 310 returns the control process to step SP14 illustrated in FIG. 6.

At steps SP19 to SP21, when the current coordinate Z is smaller than the sum of the coordinate Z(M) and the thickness T, the laser machining processor 310 moves the movement stage 353 to the upper side in the Z direction, in other words, the fθ lens 375 side by the change rate ΔZ, and moves the irradiation position of the pulse laser beam in the Z direction on the machining object 20 from the surface side of the machining object 20 to the back surface side thereof by the change rate ΔZ. After the control process has returned to step SP14 and advanced to steps SP15 to SP18, the pulse laser beam moves to irradiation spots in the in-plane direction of the projection plane in the machining area at the coordinate Z after the movement and performs the helium-cadmium machining in the machining area at the coordinate Z after the movement. Thus, steps SP14 to SP18 as the irradiation process are performed at a plurality of height positions on the machining object 20 moving in the height direction of the machining object 20 before and after step SP21 as the movement process. The irradiation process and the movement process are alternately repeated until one machined portion is formed. The laser machining processor 310 may stop traveling of the pulse laser beam from the gas laser apparatus 100 to the laser machining apparatus 300 between steps SP19 and SP21, between steps SP21 and SP14 in a case in which the control process returns from step SP21 to step SP14, and between steps SP14 and SP16, like step SP22 to be described later. Thus, when the irradiation process and the movement process are alternately repeated, step SP22 as a stop process of stopping irradiation with the pulse laser beam is provided between the irradiation process and the movement process.

At step SP19, the current coordinate Z being larger than the sum of the coordinate Z(M) and the thickness T indicates that the helium-cadmium machining is performed at a coordinate Z shifted by the change rate ΔZ and a machined portion is formed in the machining area of the current machining number M. Accordingly, the laser machining processor 310 advances the control process from step SP19 to step SP22 illustrated in FIG. 8 to form another machined portion.

Steps SP22 to SP25 will be described below with reference to FIG. 8.

Step SP22

In the present step, the laser machining processor 310 stops traveling of the pulse laser beam from the gas laser apparatus 100 to the laser machining apparatus 300. In this case, the laser machining processor 310 may close the shutter 170 through the laser processor 190 by outputting a signal to the laser processor 190 or may turn off the switch 143*a* of the pulse power module 143 by stopping the charger 141. After having stopped traveling of the pulse laser beam, the laser machining processor 310 advances the control process to step SP23.

Step SP23

In the present step, the laser machining processor 310 sets the machining number M to a value obtained by adding one to the current machining number M and advances the control process to step SP24. The set machining number M may be stored in the storage device 310*a*.

Step SP24

In the present step, the laser machining processor 310 reads the machining number Mmax from the storage device 310*a*. When the machining number M to which one is added at step SP23 is larger than the machining number Mmax, all machined portions are formed and thus the laser machining processor 310 ends the control process. When the machining number M to which one is added at step SP23 is equal to or smaller than the machining number Mmax, the laser machining processor 310 advances the control process to step SP25.

Step SP25

In the present step, the laser machining processor 310 initializes the current coordinate Z and returns the control process to step SP13 illustrated in FIG. 6. In the initialization, the laser machining processor 310 sets the coordinate Z to the coordinate Z(M). At step SP13, the laser machining processor 310 moves the movement stage 353 to the coordinates X(M), Y(M), and Z(M) in the machining area of the machining number M to which one is added at step SP23. At step SP23, since traveling of the pulse laser beam to the laser machining apparatus 300 is being stopped, the machining object 20 is not irradiated with the pulse laser beam during movement of the movement stage 353. After the control process has returned to step SP13 and proceeded to step SP22 again, a machined portion is formed in the machining area of the machining number M to which one is added at step SP23. Thus, step SP22 as a stop process of stopping irradiation with the pulse laser beam is provided between formation of the machined portion and formation of another machined portion.

3.3 Effect

The laser machining method of the present embodiment forms a machined portion in the machining area of the machining object 20 by irradiating the machining area with the pulse laser beam. The laser machining method includes steps SP14 to SP18 as the irradiation process of irradiating the entire range of the machining area with the pulse laser beam output from the gas laser apparatus 100 that is an excimer laser apparatus by guiding the pulse laser beam to part of the machining area and moving the guided pulse laser beam to irradiation spots in the in-plane direction of the projection plane in the machining area, and step SP21 as the movement process of moving the machining object 20 in the height direction of the machining object 20. The irradiation process is performed at a plurality of height positions on the machining object 20 moved in the height direction in the movement process. In the irradiation process, at least part of each irradiation spot of the pulse laser beam overlaps another irradiation spot adjacent to the irradiation spot.

In the irradiation process, at least part of each irradiation spot overlaps another irradiation spot adjacent to the irradiation spot, and the overall machining is performed at a certain coordinate Z when the entire range of the machining area is irradiated with the pulse laser beam. In the irradiation process after the machining object 20 is moved in the height direction in the movement process, the entire range of the machining area at another coordinate Z different from the coordinate Z above is irradiated with the pulse laser beam and the overall machining is performed at the other coordinate Z. A machined portion is formed through such movement of the machining object 20 and irradiation with the pulse laser beam at a plurality of height positions. In the laser machining method of the present embodiment, irradiation with the pulse laser beam is performed without the mask 335. Accordingly, in the laser machining method of the present embodiment, generation of a loss of the pulse laser beam is reduced and decrease of the energy density of the pulse laser beam with which the machining area is irradiated is reduced as compared to a case in which the mask 335 is provided. The reduction of decrease of the energy density allows a machined portion to be easily formed on the machining object 20 as compared to a case in which the mask 335 is provided, even when the machining object 20 is a hard material such as a CMC. When an excimer laser apparatus is used, the wavelength of the pulse laser beam is short and the pulse energy thereof is high as compared to a case in which no excimer laser apparatus is used, and thus the divergence angle of the pulse laser beam is reduced. As the divergence angle is reduced, the depth of a focal point at the machining object 20 increases. Accordingly, the laser machining method perform the above-described machining on the machining object 20 having a large depth at a concave part of the front surface of the machining object 20, the machining object 20 having a large height at a convex part of the front surface of the machining object 20, and the machining object 20 having a large thickness.

In the laser machining method of the present embodiment, irradiation with the pulse laser beam is performed without the transfer optical system 337. Thus, blurring of a transfer pattern does not occur, which reduces spread of the irradiation area of each irradiation spot of the pulse laser beam. Accordingly, decrease of the energy density of irradiation in the machining area is reduced.

During the irradiation process of the present embodiment, at least one round of movement and irradiation of/with the pulse laser beam is performed along one or more irradiation lines of a plurality of concentric irradiation lines in the machining area, and then at least one round of movement and irradiation of/with the pulse laser beam is performed along other one or more irradiation lines of the irradiation lines. Thus, the helium-cadmium machining is performed during the irradiation process. For example, when a circular hole is to be formed as a machined portion, the helium-cadmium machining can easily form the circular hole as compared to the raster scanning machining. For example, when a machined portion has a ring shape, the helium-cadmium machining can easily form the machined portion as compared to the raster scanning machining. For example, when a machined portion is a rectangular hole, the raster scanning machining can easily form the rectangular hole as compared to the helium-cadmium machining.

In the laser machining method of the present embodiment, the irradiation process and the movement process are alternately repeated until one machined portion is formed. In this case, until a machined portion is formed in the current machining area, the movement stage 353 does not need to be moved in the X and Y directions for irradiation of another machining area with the pulse laser beam. When the movement of the movement stage 353 is unnecessary, a load on the laser machining processor 310 is reduced as compared to a case in which the movement stage 353 is moved in the X and Y directions.

Figure 9:
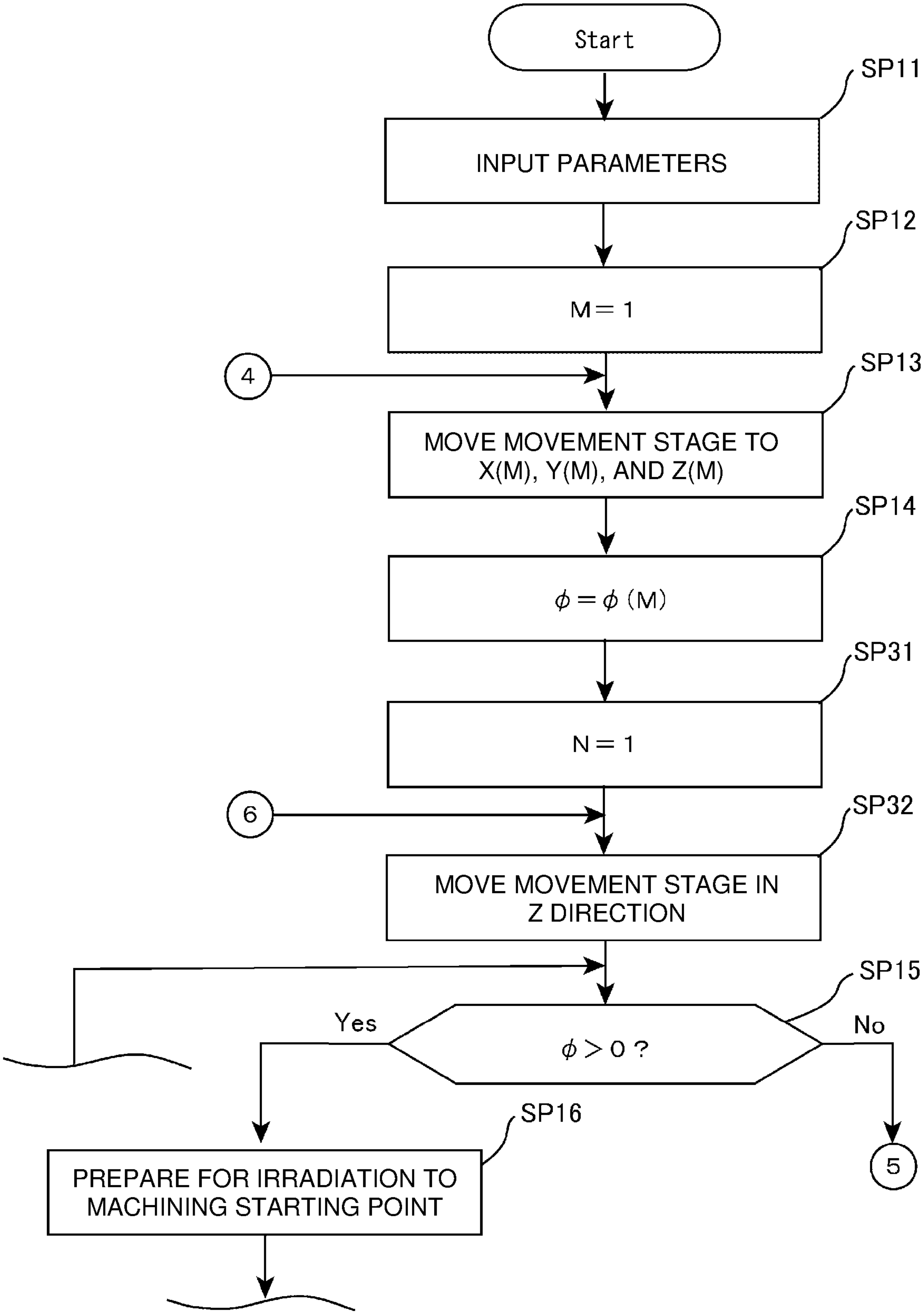
FIG. 9 is a diagram illustrating a part of a flowchart of control by a laser machining processor of a modification of Embodiment 1.
Figure 10:
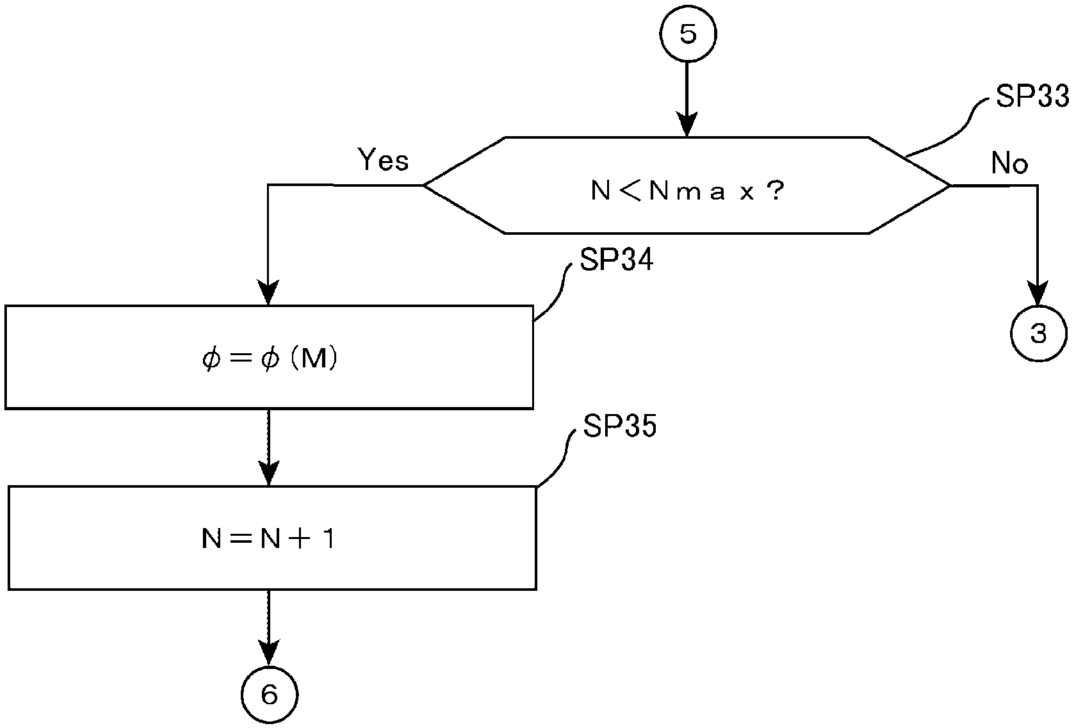
FIG. 10 is a diagram illustrating another part of the flowchart of control by the laser machining processor of the modification of Embodiment 1.

The flowchart of control by the laser machining processor 310 of the present embodiment is not limited to that described above. A modification of the flowchart of control by the laser machining processor 310 will be described below. FIG. 9 is a diagram illustrating a part of a flowchart of control by the laser machining processor 310 of the present modification. FIG. 10 is a diagram illustrating another part of the flowchart of control by the laser machining processor 310 of the present modification.

As illustrated in FIG. 9, the flowchart of control of the present modification includes steps SP31 and SP32 between steps SP14 and SP15, which is difference from the flowchart of control of Embodiment 1.

As illustrated in FIG. 9, after having set the irradiation diameter ϕ to the irradiation diameter ϕ(M) at step SP14, the laser machining processor 310 of the present modification advances the control process to step SP31.

Step SP31

In the present step, the laser machining processor 310 sets the current repetition number N to 1 and advances the control process to step SP32. The repetition number N is the number of times that the movement stage 353 is moved from the coordinate Z(M) to the upper side in the Z direction at step SP13.

Step SP32

In the present step, the laser machining processor 310 moves the movement stage 353 from the coordinate Z(M) at step SP13 to the upper side in the Z direction, thereby moving the irradiation position of the pulse laser beam in the Z direction on the machining object 20 from the surface side of the machining object 20 to the back surface side. Thus, the present step is a movement process of moving the machining object 20 in the height direction of the machining object 20. The laser machining processor 310 may move the movement stage 353 at constant speed or with acceleration. After having moved the movement stage 353, the laser machining processor 310 advances the control process to step SP15.

At step SP15, when the current irradiation diameter ϕ is larger than zero, the laser machining processor 310 advances the control process to step SP16. The control process at step SP16 and later includes steps SP17 to SP18 described above in Embodiment 1 and is omitted in illustration of FIG. 9 and the following description. Similarly to the irradiation process of Embodiment 1, all irradiation in the machining area is completed when the irradiation process of the present embodiment at steps SP14 to SP18 ends. In the irradiation process, the machining object 20 moves in the height direction as described above for step SP32 as the movement process. Thus, the irradiation process is performed at a plurality of height positions on the moving machining object 20. At step SP15, when the irradiation diameter ϕ is equal to or smaller than zero, the laser machining processor 310 advances the control process to step SP33 illustrated in FIG. 10.

As illustrated in FIG. 10, the flowchart of control of the present modification includes steps SP33 to SP35 in place of steps SP19 to SP21, which is difference from the flowchart of control of Embodiment 1.

Step SP33

In the present step, the laser machining processor 310 reads a maximum repetition number $N_{max}$ from the storage device 310*a*. When the current repetition number N is equal to or larger than the maximum repetition number $N_{max}$, the laser machining processor 310 advances the control process to step SP22 illustrated in FIG. 8. In a case in which the control process proceeds to step SP22, the helium-cadmium machining has been performed while the movement stage 353 is moved for the repetition number $N_{max}$, and a machined portion has been formed in the machining area of the current machining number M. Accordingly, the laser machining processor 310 advances the control process from step SP33 to step SP22 illustrated in FIG. 8 to form another machined portion. The maximum repetition number $N_{max}$ is stored as a parameter in the storage device 310*a* at step SP11. In the flowchart of control of the present modification, step SP25 illustrated in FIG. 8 is unnecessary and the laser machining processor 310 returns the control process to step SP13 illustrated in FIG. 9 when the machining number M to which one is added at step SP23 is equal to or smaller than the machining number Mmax at step SP24 illustrated in FIG. 8.

In the present step, when the current repetition number N is smaller than the maximum repetition number $N_{max}$, the laser machining processor 310 advances the control process to step SP34.

Step SP34

In the present step, the laser machining processor 310 reads the irradiation diameter ϕ(M) from the storage device 310*a* and sets the irradiation diameter ϕ to the read irradiation diameter ϕ(M). After having set the irradiation diameter ϕ(M), the laser machining processor 310 advances the control process to step SP35.

Step SP35

The laser machining processor 310 sets the repetition number N to a value obtained by adding one to the current repetition number N and returns the control process to step SP32 illustrated in FIG. 9. The set repetition number N may be stored in the storage device 310*a*. In the flowchart of control of the present modification, machining on the movement stage 353 moved in the Z direction is repeated while the irradiation diameter is reduced $N_{max}$ times.

In the flowchart of control of Embodiment 1, after the helium-cadmium machining is performed at a certain coordinate Z, the movement stage 353 is moved in the Z direction and the helium-cadmium machining is performed at another coordinate Z. In other words, the irradiation process and the movement process are alternately repeated until one machined portion is formed. However, in the flowchart of control of the present modification, the movement stage 353 is moved in the Z direction until the current repetition number N becomes equal to or larger than the maximum repetition number $N_{max}$ through steps SP14, SP31, SP32, SP15 to SP18, and SP33 to SP35, and the helium-cadmium machining is performed during the movement. Thus, the movement process is performed during the irradiation process in the flowchart of control of the present modification. In this case, a time in which one machined portion is formed is shortened as compared to a case in which the irradiation process and the movement process are alternately repeated.

4. Description of Laser Machining System and Laser Machining Method of Embodiment 2

The laser machining system 10 and laser machining method of Embodiment 2 will be described below. Any component identical to a component described above is denoted by the same reference sign, and duplicate description thereof is omitted unless otherwise stated.

4.1 Configuration

Figure 11:
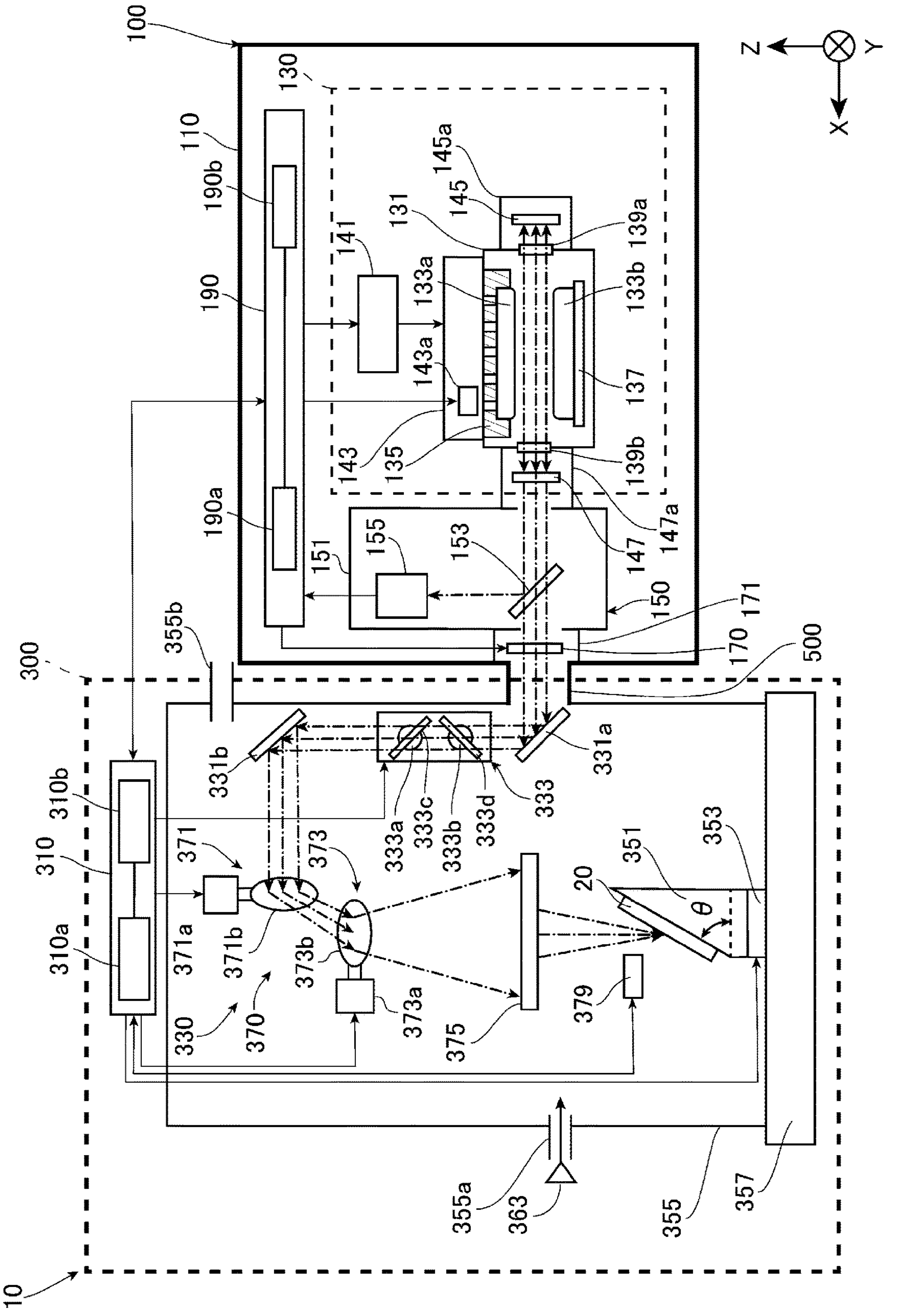
FIG. 11 is a schematic diagram illustrating an example of the entire schematic configuration of a laser machining system of Embodiment 2.

FIG. 11 is a schematic diagram illustrating an example of the entire schematic configuration of the laser machining system 10 of the present embodiment. In the laser machining apparatus 300 of the present embodiment, the table 351 has a configuration different from the configuration of the table 351 of Embodiment 1. The laser machining apparatus 300 of the present embodiment further includes a height meter 379 disposed in the internal space of the housing 355 and electrically connected to the laser machining processor 310.

The table 351 is tilted relative to the XY plane. Thus, the front and back surfaces of the machining object 20 are tilted relative to the Z axis and the XY plane. Accordingly, the projection plane of the present embodiment faces the machining area but is not parallel thereto, and the in-plane direction of the projection plane is tilted relative to the in-plane direction of the machining area. The tilt angle of the machining object 20 between the back surface of the machining object 20 and the XY plane is referred to as a tilt angle θ.

The height meter 379 includes a non-illustrated measurement member that is movable in the Z direction. The measurement member is, for example, a metal bar member but not particularly limited. The height meter 379 is electrically connected to the laser machining processor 310 and can be moved in the X, Y, and Z directions under control of the laser machining processor 310. When an end part of the measurement member contacts the central position of the machining area of the machining object 20 tilted by the table 351 as the height meter 379 moves, the height meter 379 transmits a signal indicating the coordinate Z at the contact part to the laser machining processor 310. The contact position is not particularly limited and may be any position in the machining area. After having received the signal, the laser machining processor 310 stores the coordinate Z indicated by the signal in the storage device 310*a*.

4.2 Operation

Operation of the laser machining processor 310 in the present embodiment will be described below.

Figure 12:
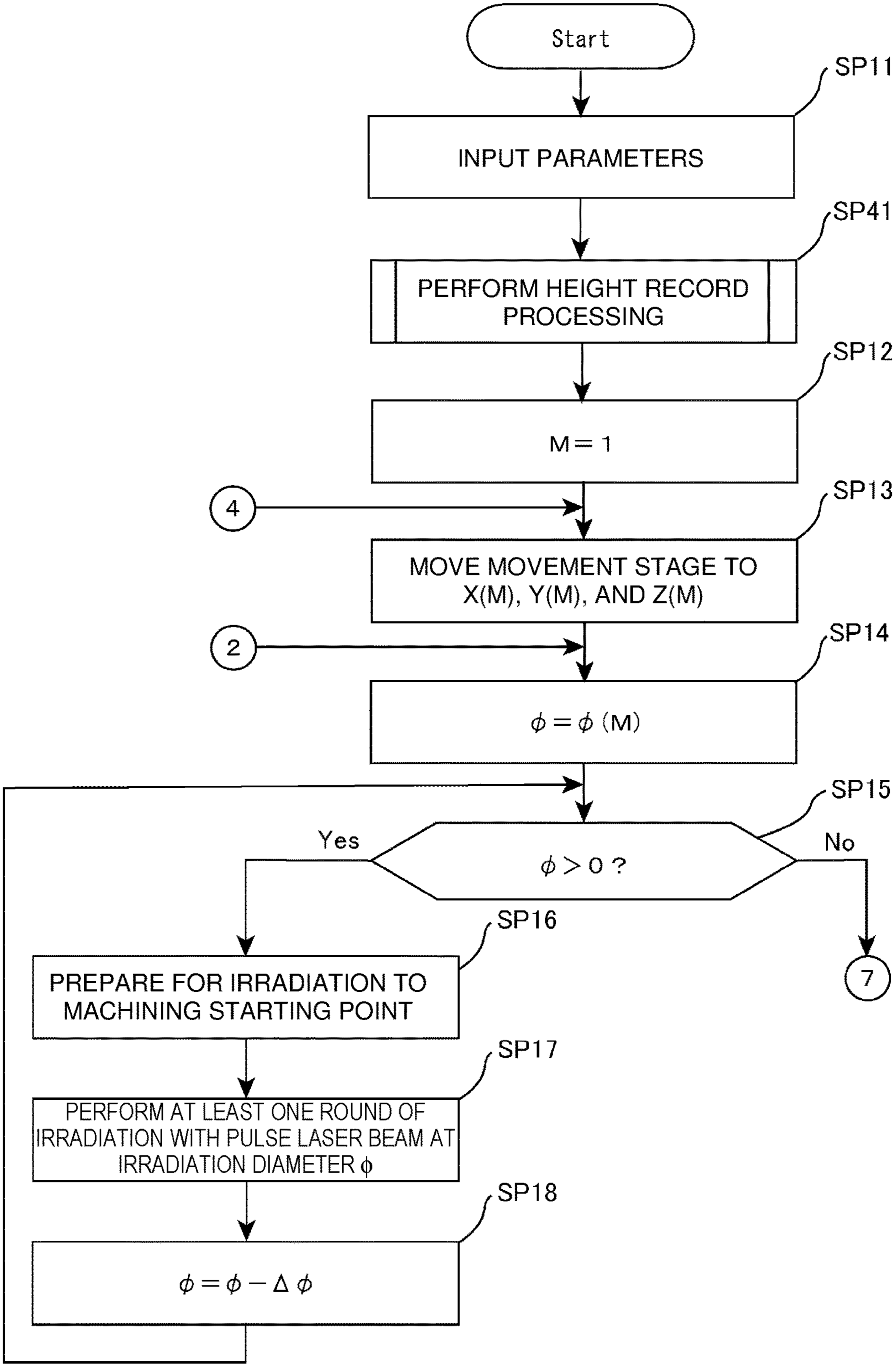
FIG. 12 is a diagram illustrating a part of a flowchart of control by a laser machining processor of Embodiment 2.

FIG. 12 is a diagram illustrating a part of a flowchart of control by the laser machining processor 310 of the present embodiment. As illustrated in FIG. 12, the flowchart of control of the present embodiment includes step SP41 between steps SP11 and SP12, which is difference from the flowchart of control of Embodiment 1.

At step SP11, when parameters are input to the storage device 310*a* of the laser machining processor 310, the laser machining processor 310 advances the control process to step SP41. Although the coordinate Z(M) of an initial irradiation position is input as one of the parameters at step SP11 of Embodiment 1, the coordinate Z(M) at step SP11 of the present embodiment is recorded in height record processing at step SP41. Thus, the coordinate Z(M) is input as zero at step SP11 of the present embodiment.

Step SP41

In the present step, the laser machining processor 310 transitions to the height record processing. After the height record processing has ended, the laser machining processor 310 advances the control process to step SP12.

Figure 13:
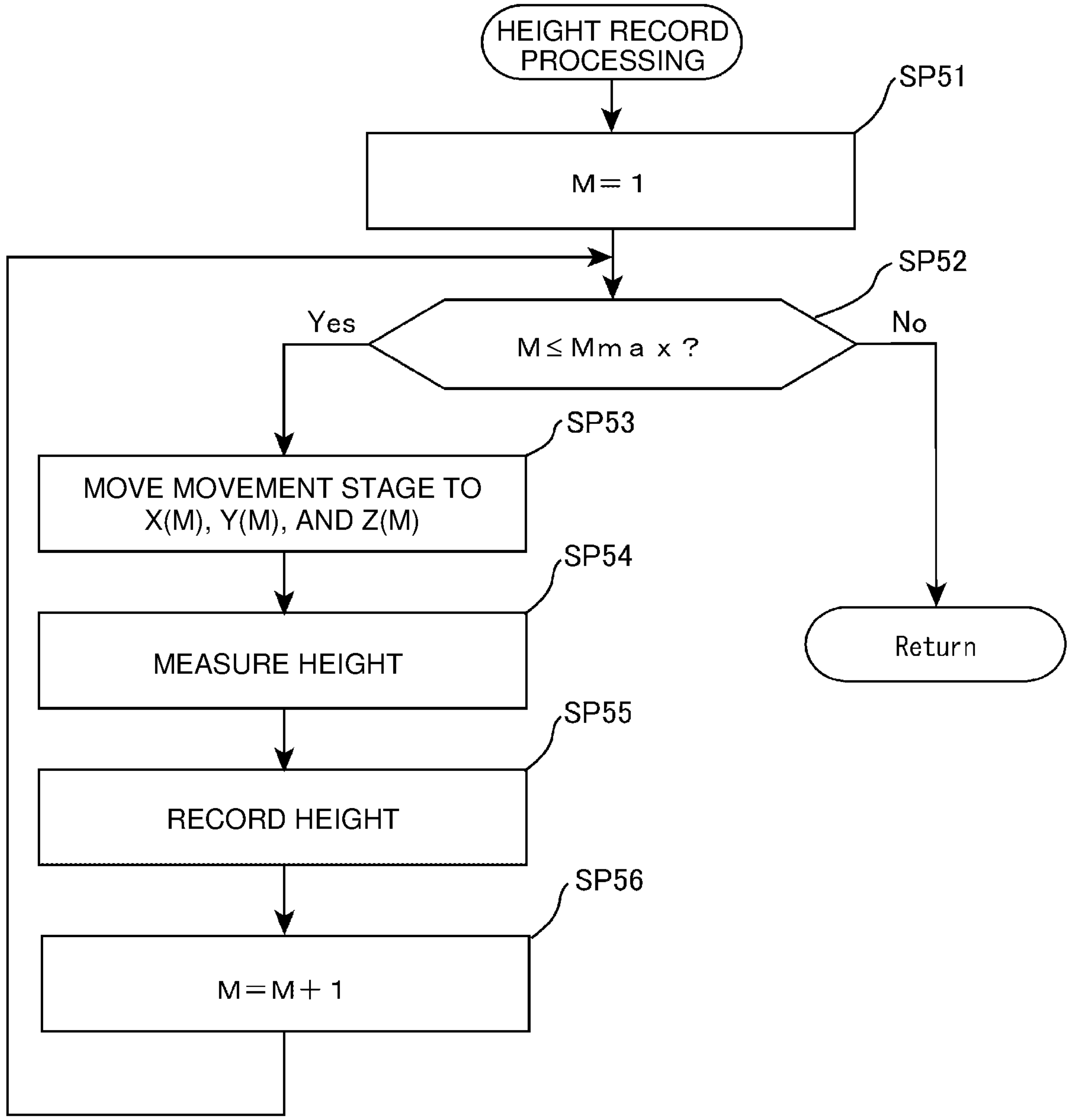
FIG. 13 is a flowchart of control by the laser machining processor in height record processing.

FIG. 13 illustrates a flowchart of control by the laser machining processor 310 in the height record processing. As illustrated in FIG. 13, the control flowchart in the height record processing includes steps SP51 to SP56.

Step SP51

In the present step, the laser machining processor 310 sets, to the machining number M1, the first machining number M since the machining object 20 is supported on the movement stage 353. After having set the machining number M to the machining number M1, the laser machining processor 310 advances the control process to step SP52.

Step SP52

In the present step, the laser machining processor 310 reads the machining number Mmax from the storage device 310*a*. When the current machining number M is larger than the machining number Mmax, the coordinate Z of each machined portion has been input. Thus, the laser machining processor 310 ends the control process in the height record processing and advances the control process to step SP12 illustrated in FIG. 12. When the current machining number M is equal to or smaller than the machining number Mmax, the laser machining processor 310 advances the control process to step SP53.

Step SP53

In the present step, the laser machining processor 310 reads position data of the first initial irradiation position in the machining area of the current machining number M from the storage device 310*a* and moves the movement stage 353 to the coordinates X(M), Y(M), and Z(M). The position data is the position data input at step SP11. In the present step, the coordinate Z(M) is zero. After having moved the movement stage 353, the laser machining processor 310 advances the control process to step SP54.

Step SP54

In the present step, the laser machining processor 310 causes the end part of the measurement member of the height meter 379 to contact the machining area of the current machining number M and receives, from the height meter 379, a signal indicating a height position that is the coordinate Z at the contact part. Thus, the present step is a measurement process of measuring the height position by the height meter 379. The coordinate Z is the height position of the first irradiation position in the machining area of the current machining number M. After having measured the coordinate Z, the laser machining processor 310 advances the control process to step SP55.

Step SP55

In the present step, the laser machining processor 310 stores the measured coordinate Z as one of the parameters at step SP11 in the storage device 310*a*. After having stored the coordinate Z, the laser machining processor 310 advances the control process to step SP56.

Step SP56

In the present step, the laser machining processor 310 adds one to the current machining number M and returns the control process to step SP52.

After the coordinate Z of the first irradiation position in each machining area is measured and stored through steps SP51 to SP56, the control process proceeds from step SP52 to step SP12 illustrated in FIG. 12. In this manner, the height measurement and storage processing including the measurement process is performed before the irradiation process.

Description of the control flowchart illustrated in FIG. 12 continues with reference to FIG. 12.

At step SP13 of the present embodiment, similarly to step SP13 of Embodiment 1, the laser machining processor 310 reads position data of the first irradiation position in the machining area of the machining number M and moves the movement stage 353 to the coordinates X(M), Y(M), and Z(M). Similarly to the coordinates X(M) and Y(M) of Embodiment 1, the coordinates X(M) and Y(M) of the present embodiment are input as parameters at step SP11. However, the coordinate Z(M) of the present embodiment is the coordinate measured at step SP54 unlike that of Embodiment 1, which is input as a parameter at step SP11. Step SP13 of the present embodiment is a movement process of moving the machining object 20 to the height position measured in the measurement process.

At step SP15 of the present embodiment, when the current irradiation diameter ϕ is larger than zero, the laser machining processor 310 advances the control process to steps SP16 to SP18. As described above, the front and back surfaces of the machining object 20 of the present embodiment are tilted relative to the Z axis and the XY plane. Thus, at step SP17, the machining area having a plane direction tilted relative to the optical axis of the pulse laser beam is irradiated with the pulse laser beam. In this case, the pulse laser beam has a light condensation position between the upper and lower ends of the machining area in the height direction of the machining object 20. The light condensation position is substantially the middle point between the upper and lower ends.

Figure 14:
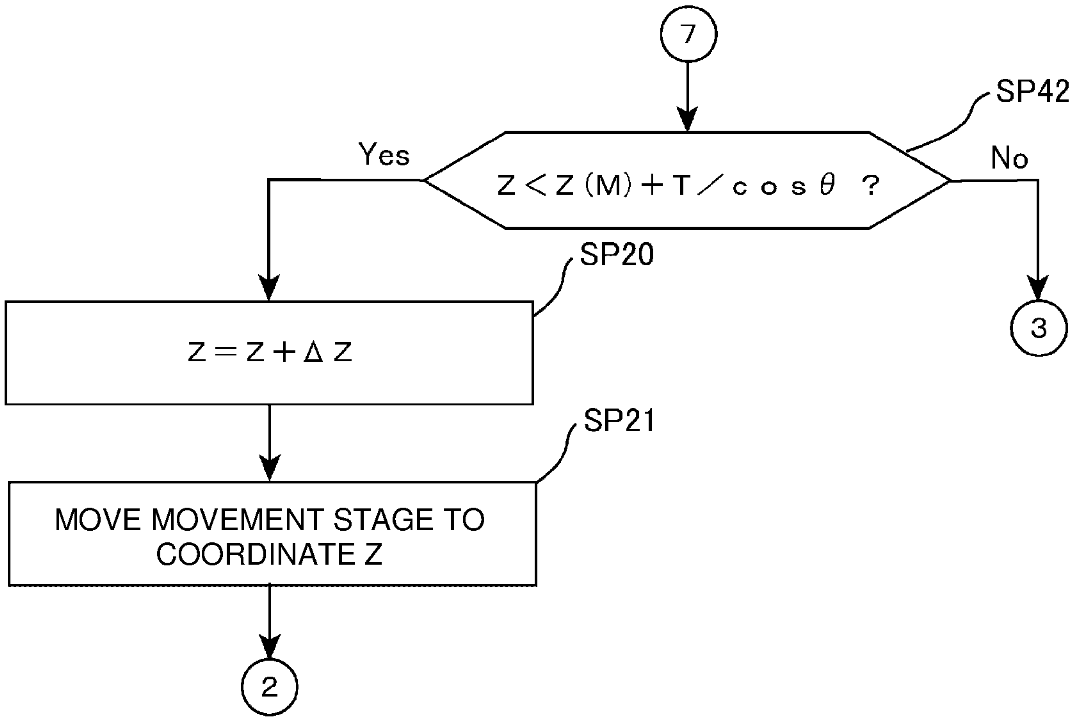
FIG. 14 is a diagram illustrating another part of the flowchart of control by the laser machining processor of Embodiment 2.

At step SP15, when the irradiation diameter ϕ is equal to or smaller than zero, the laser machining processor 310 advances the control process to step SP42 illustrated in FIG. 14.

FIG. 14 is a diagram illustrating another part of the flowchart of control by the laser machining processor 310 of the present embodiment. The flowchart of control of the present embodiment includes step SP42 in place of step SP19, which is difference from the flowchart of control of Embodiment 1.

Step SP42

The thickness of the machining object 20 is T and the machining object 20 of the present embodiment is tilted relative to the XY plane. The length of the tilted machining object 20 in the Z direction is T/cos θ where the tilt angle θ represents the tilt angle of the machining object 20 between the back surface of the machining object 20 and the XY plane as described above. For example, the thickness T is substantially 2 mm and the tilt angle θ is substantially 60°, but the thickness T and the tilt angle θ are not limited thereto. In the present step, when the current coordinate Z is smaller than the sum of the coordinate Z(M) and T/cos θ, the laser machining processor 310 sequentially advances the control process to steps SP20 and SP21 and step SP14 illustrated in FIG. 12. When the current coordinate Z is equal to or larger than the sum of the coordinate Z(M) and T/cos θ, the laser machining processor 310 advances the control process to step SP22 illustrated in FIG. 8.

4.3 Effect

In the irradiation process of the laser machining method of the present embodiment, the machining area having a plane direction tilted relative to the optical axis of the pulse laser beam is irradiated with the pulse laser beam. Accordingly, the machined portion is obliquely formed relative to the optical axis of the pulse laser beam and the thickness direction of the machining object 20.

In the irradiation process of the laser machining method of the present embodiment, the pulse laser beam has a light condensation position between the upper and lower ends of the machining area in the height direction of the machining object 20. Accordingly, the machining object 20 can be irradiated with the pulse laser beam even when the machining object 20 is tilted relative to the optical axis of the pulse laser beam.

Similarly to the laser machining method of the modification of Embodiment 1, the laser machining method of the present embodiment may include steps SP31 and SP32 between steps SP14 and SP15, include steps SP33 to SP35 in place of steps SP42, SP20, and SP21, and omit step SP25. Thus, in the laser machining method of the present embodiment, the movement process may be performed during the irradiation process.

5. Description of Laser Machining System and Laser Machining Method of Embodiment 3

The laser machining system 10 and laser machining method of Embodiment 3 will be described below. Any component identical to a component described above is denoted by the same reference sign, and duplicate description thereof is omitted unless otherwise stated.

5.1 Configuration

The laser machining apparatus 300 of the present embodiment has the same configuration as the laser machining apparatus 300 of Embodiment 2, and thus description thereof is omitted.

5.2 Operation

Operation of the laser machining processor 310 in the present embodiment will be described below.

Figure 15:
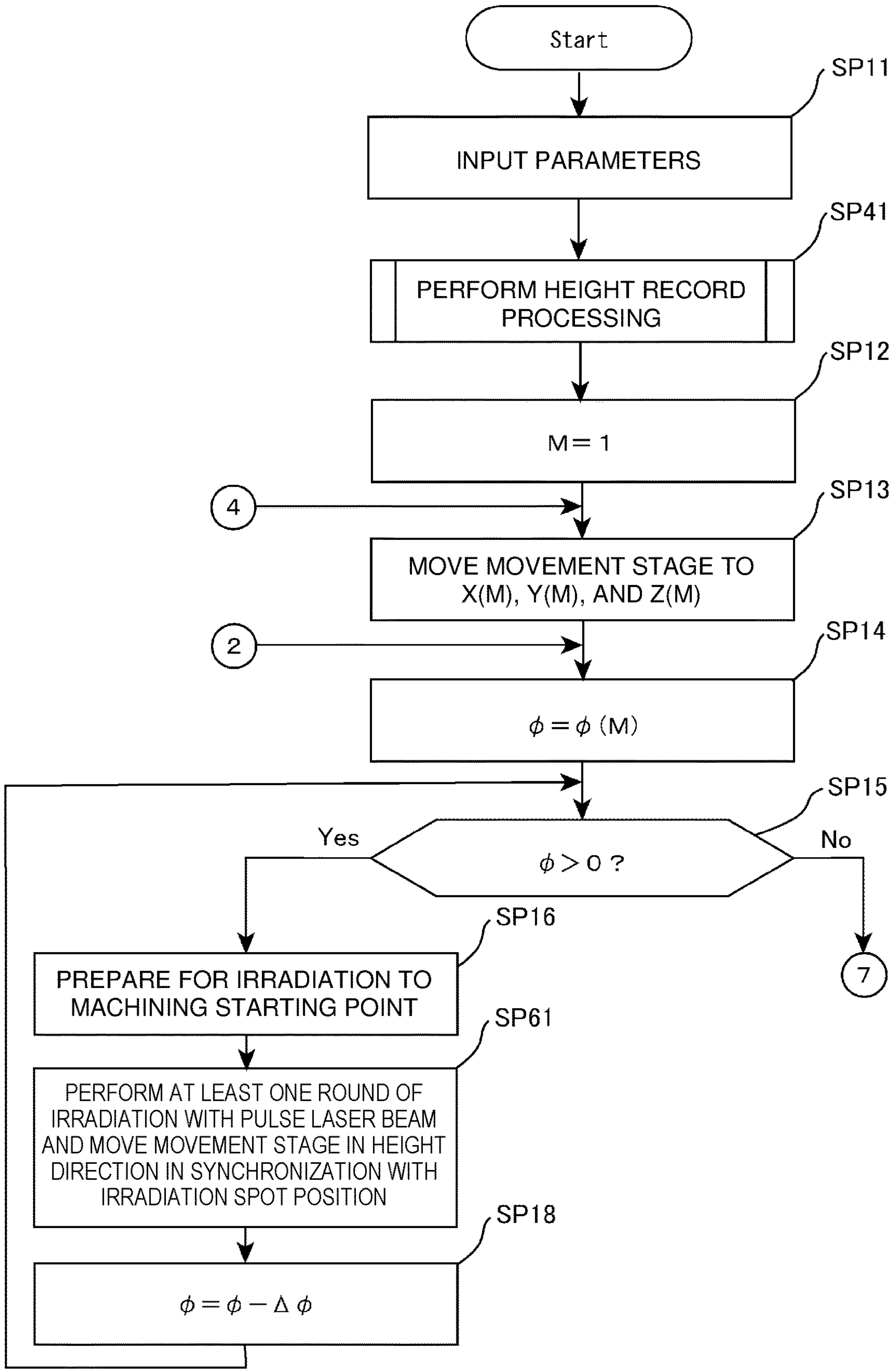
FIG. 15 is a diagram illustrating a part of a flowchart of control by a laser machining processor of Embodiment 3.

FIG. 15 is a diagram illustrating a part of a flowchart of control by the laser machining processor 310 of the present embodiment. The flowchart of control of the present embodiment includes step SP61 in place of step SP17, which is difference from the flowchart of control of Embodiment 2. Thus, the irradiation process of the present embodiment includes steps SP14 to SP16, SP61, and SP18.

Step SP61

Figure 16:
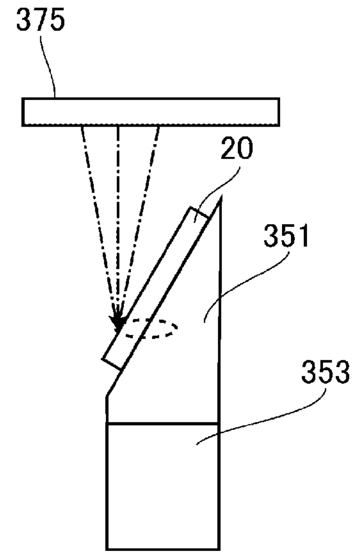
FIG. 16 is a diagram for description of step SP61.
Figure 17:
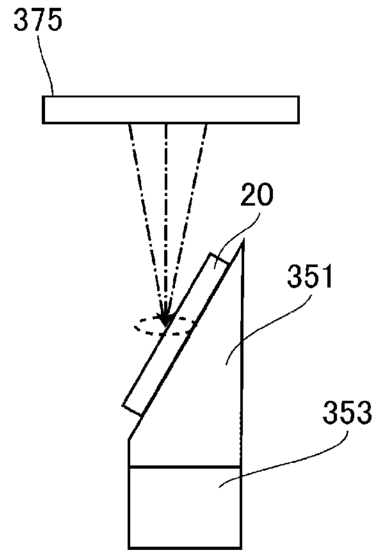
FIG. 17 is a diagram for description of step SP61.
Figure 18:
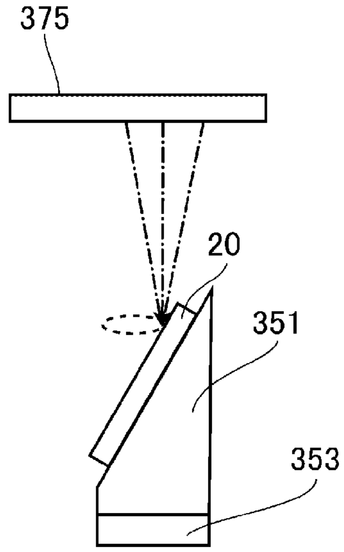
FIG. 18 is a diagram for description of step SP61.

In the present step, the laser machining processor 310 performs at least one round of movement and irradiation of/with the pulse laser beam and reciprocates the machining object 20 in the Z direction through the movement stage 353 in synchronization with the position of each irradiation spot of the pulse laser beam on the machining object 20. FIGS. 16 to 18 are diagrams for description of the present step, in each of which movement and irradiation of/with the pulse laser beam are illustrated with a dashed line. As illustrated in FIGS. 16 to 18, the laser machining processor 310 reciprocates the machining object 20 in the height direction through the movement stage 353 in synchronization with the in-plane position of each irradiation spot of the pulse laser beam condensing to the machining area on the machining object 20 moved in the height direction so that the diameter of each irradiation spot hardly changes in the machining area. In this case, the distance between the fθ lens 375 and each irradiation spot of the pulse laser beam on the machining object 20 in the Z direction is substantially constant. The present step as described above is part of the irradiation process and is also part of the movement process, and part of the movement process of the present embodiment is performed during the irradiation process. The irradiation process is performed at a plurality of height positions on the reciprocating machining object 20. After at least one round of movement and irradiation of/with the pulse laser beam has been performed and the movement stage 353 has reciprocated in the Z direction, the laser machining processor 310 advances the control process to step SP18. When the control process proceeds from step SP18 to step SP42 through step SP15, all irradiation in the machining area is completed and the irradiation process ends.

5.3 Effect

In the laser machining method of the present embodiment, the movement process is performed during the irradiation process. In the movement process, the machining object 20 is moved in the height direction in synchronization with the in-plane position of each irradiation spot of the pulse laser beam condensing to the machining area moved in the height direction in the movement process so that the diameter of each irradiation spot hardly changes in the irradiation process. Accordingly, even when the machining object 20 is tilted, the pulse laser beam condenses to the machining area of the tilted machining object 20 and change of the diameter of each irradiation spot is prevented. In a case in which change of the diameter of each irradiation spot is prevented, decrease of the energy density of the pulse laser beam in the machining area is reduced even when the machining object 20 is tilted. Thus, a machined portion can be easily formed on the machining object 20 as compared to a case in which the energy density decreases.

6. Description of Laser Machining System and Laser Machining Method of Embodiment 4

The laser machining system 10 and laser machining method of Embodiment 4 will be described below. Any component identical to a component described above is denoted by the same reference sign, and duplicate description thereof is omitted unless otherwise stated.

6.1 Configuration

The laser machining system 10 of the present embodiment has the same configuration as the laser machining system 10 of Embodiment 1, and thus description thereof is omitted.

6.2 Operation

In the laser machining method of the present embodiment, the irradiation process performed in each machining area and the movement process are alternately performed. Operation of the laser machining processor 310 in the present embodiment will be described below.

Figure 19:
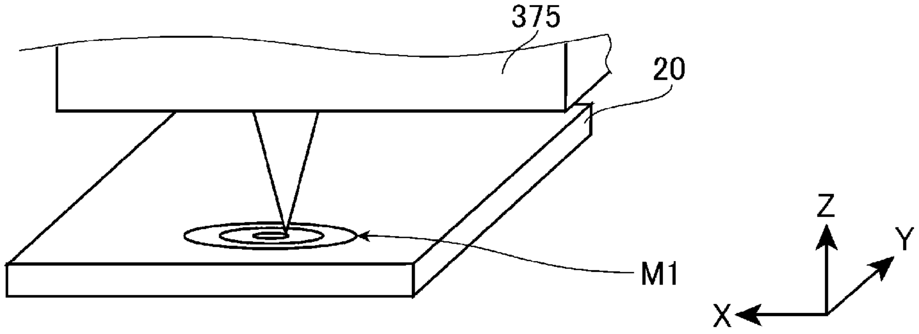
FIG. 19 is a diagram for description of helium-cadmium machining of Embodiment 4.
Figure 20:
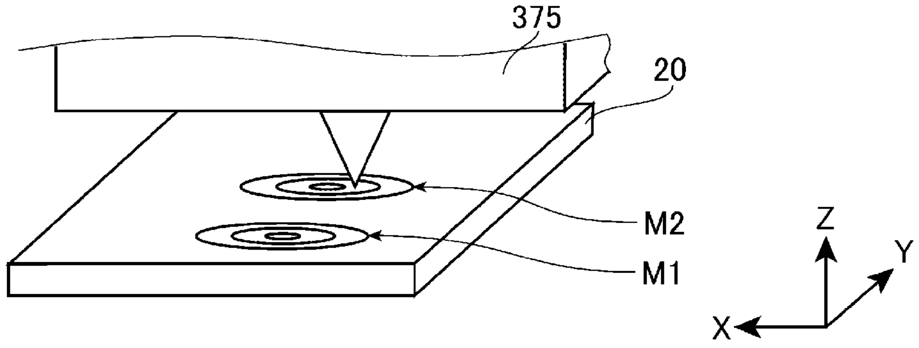
FIG. 20 is a diagram for description of the helium-cadmium machining of Embodiment 4.
Figure 21:
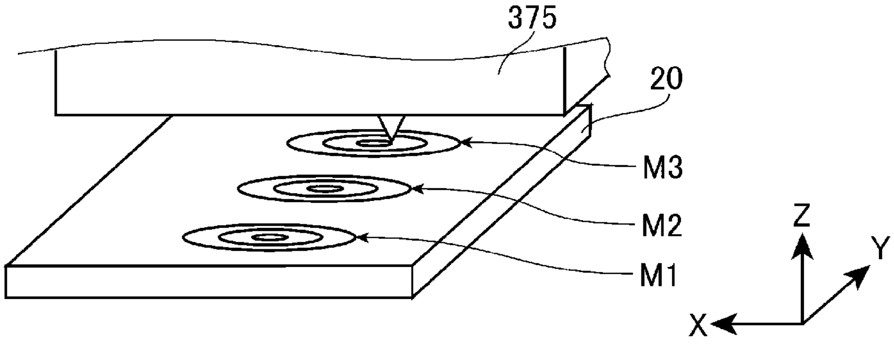
FIG. 21 is a diagram for description of the helium-cadmium machining of Embodiment 4.

As illustrated in FIG. 19, the laser machining processor 310 of the present embodiment performs the helium-cadmium machining in the machining area of the machining number M1 at a certain coordinate Z. Subsequently, as illustrated in FIG. 20, the helium-cadmium machining is performed in the machining area of the machining number M2 at the coordinate Z at which the helium-cadmium machining is performed in the machining area of the machining number M1. Subsequently, as illustrated in FIG. 21, the helium-cadmium machining is performed in the machining area of the machining number M3 at the coordinate Z at which the helium-cadmium machining is performed in the machining area of the machining number M1. Accordingly, the laser machining processor 310 performs the helium-cadmium machining in the machining areas in the order of the machining numbers M1, M2, and M3 without changing the coordinate Z.

After having performed the helium-cadmium machining in the machining area of the machining number M3 as illustrated in FIG. 21, the laser machining processor 310 sets the coordinate Z to a value obtained by adding the change rate ΔZ of the coordinate Z to the current coordinate Z, moves the movement stage 353 to the set coordinate Z, and performs the helium-cadmium machining in the machining areas in the order of the machining areas of the machining numbers M1, M2, and M3 as described above at the set coordinate Z. Through such repetition, each machining area is irradiated with the pulse laser beam and a machined portion is formed in each machining area through the irradiation with the pulse laser beam.

Thus, during the irradiation process performed in a plurality of machining areas at a certain coordinate Z, after all irradiation in the irradiation process in one or more machining areas of the machining areas is completed, the irradiation process in other one or more machining areas of the machining areas is performed. After the irradiation process in the other one or more machining areas is performed, the movement process is performed. After the movement process, the coordinate Z is changed and the irradiation process is performed. The irradiation process and the movement process are repeated in this manner.

6.3 Effect

In the laser machining method of the present embodiment, during the irradiation process performed in a plurality of machining areas, after all irradiation in the irradiation process in one or more machining areas of the machining areas is completed, the irradiation process in other one or more machining areas of the machining areas is performed.

In the method, machining areas irradiated with the pulse laser beam change at each irradiation process. With the change of the machining areas, heat concentration in the machining areas due to irradiation with the pulse laser beam is reduced and local heat generation on the machining object 20 is reduced.

In the laser machining method of the present embodiment, the irradiation process performed in each machining area and the movement process are alternately performed. Accordingly, the number of movement processes is reduced and a load on the laser machining processor 310 is reduced as compared to a case in which the irradiation process and the movement process are repeated in one machining area.

7. Description of Laser Machining System and Laser Machining Method of Embodiment 5

The laser machining system 10 and laser machining method of Embodiment 5 will be described below. Any component identical to a component described above is denoted by the same reference sign, and duplicate description thereof is omitted unless otherwise stated.

7.1 Configuration

The laser machining system 10 of the present embodiment has the same configuration as the laser machining system 10 of Embodiment 1, and thus description thereof is omitted.

7.2 Operation

In the laser machining method of the present embodiment, similarly to the laser machining method of Embodiment 4, the irradiation process performed in each machining area and the movement process are alternately performed. In the irradiation process of the present embodiment, the order of irradiation is different from that in the irradiation process of Embodiment 4. Operation of the laser machining processor 310 in the present embodiment will be described below.

Figure 22:
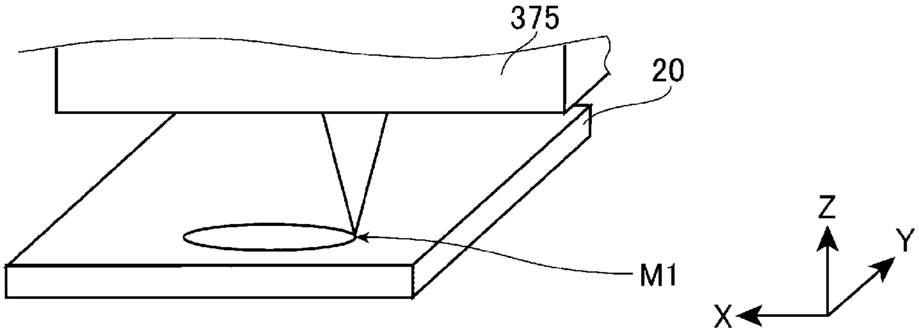
FIG. 22 is a diagram for description of irradiation with a pulse laser beam of Embodiment 5.
Figure 23:
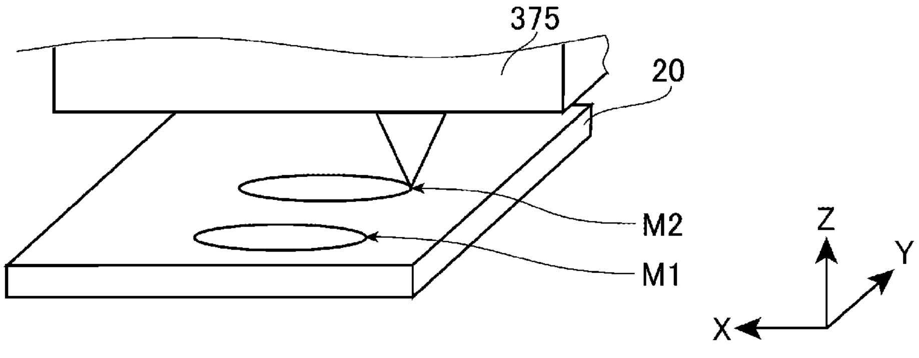
FIG. 23 is a diagram for description of the irradiation with a pulse laser beam of Embodiment 5.
Figure 24:
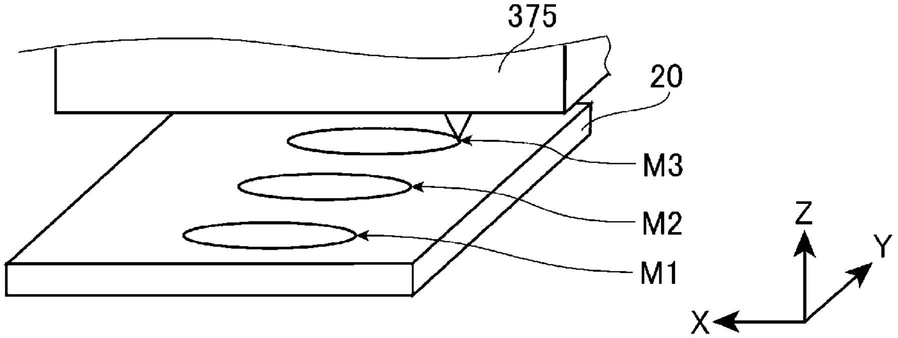
FIG. 24 is a diagram for description of the irradiation with a pulse laser beam of Embodiment 5.

As illustrated in FIG. 22, in the helium-cadmium machining, the laser machining processor 310 of the present embodiment performs at least one round of movement and irradiation of/with the pulse laser beam in the machining area of the machining number M1 at a certain coordinate Z and the irradiation diameter ϕ. Subsequently, as illustrated in FIG. 23, in the helium-cadmium machining, the laser machining processor 310 performs at least one round of movement and irradiation of/with the pulse laser beam in the machining area of the machining number M2 at the same coordinate Z and irradiation diameter ϕ as those for the machining area of the machining number M1. Subsequently, as illustrated in FIG. 24, in the helium-cadmium machining, the laser machining processor 310 performs at least one round of movement and irradiation of/with the pulse laser beam in the machining area of the machining number M3 at the same coordinate Z and irradiation diameter ϕ as those for the machining number M1. Accordingly, the laser machining processor 310 performs movement and irradiation of/with the pulse laser beam in the machining areas in the order of the machining areas of the machining numbers M1, M2, and M3 without changing the coordinate Z and the irradiation diameter ϕ.

Figure 25:
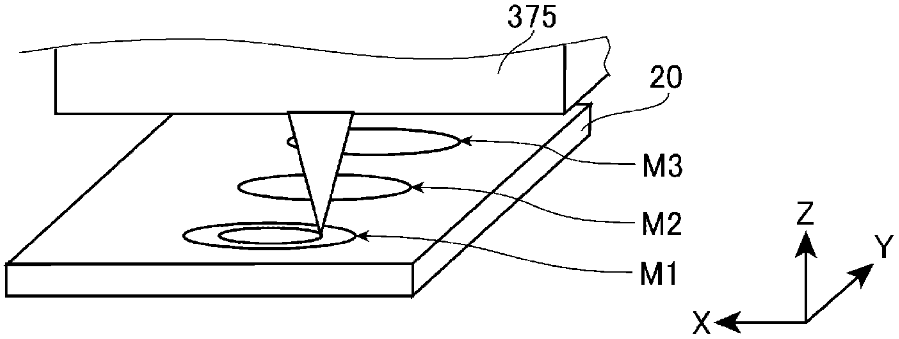
FIG. 25 is a diagram for description of the irradiation with a pulse laser beam of Embodiment 5.

Subsequently, the laser machining processor 310 sets the irradiation diameter ϕ to a value obtained by subtracting the irradiation diameter change rate Δϕ from the current irradiation diameter ϕ. As illustrated in FIG. 25, in the helium-cadmium machining, the laser machining processor 310 performs movement and irradiation of/with the pulse laser beam in the machining area of the machining number M1 at the unchanged coordinate Z and the set irradiation diameter ϕ. Subsequently, although not illustrated, the laser machining processor 310 performs movement and irradiation of/with the pulse laser beam in the machining areas of the machining numbers M2 and M3 in the stated order at the unchanged coordinate Z and the set irradiation diameter ϕ. Through such repetition, the laser machining processor 310 performs the helium-cadmium machining in the machining areas in the order of the machining areas of the machining numbers M1, M2, and M3 without changing the coordinate Z.

Through the repetition, each machining area is irradiated with the pulse laser beam and a machined portion is formed in each machining area through the irradiation of the pulse laser beam.

In this manner, during the irradiation process performed in a plurality of machining areas, the irradiation process in one or more machining areas of the machining areas is performed after irradiation in the irradiation process in other one or more machining areas of the machining areas is stopped halfway through. Thus, the irradiation process in the one or more machining areas is performed before all irradiation in the irradiation process in the other one or more machining areas is completed. In addition, after the irradiation process in one or more machining areas is stopped halfway through, the irradiation process in other one or more machining areas is performed. Thus, the irradiation process in the other one or more machining areas is performed before all irradiation in the irradiation process in the one or more machining areas is completed. In this manner, in the irradiation process of the present embodiment, part of irradiation in the irradiation process in one or more machining areas and part of irradiation in the irradiation process in other one or more machining areas are alternately performed until the entire range of each machining area is irradiated with the pulse laser beam.

In the irradiation process in machining areas, after the machining area of the machining number M1 is irradiated with the pulse laser beam at a certain irradiation diameter ϕ, the machining area to be irradiated with the pulse laser beam is changed to the machining area of the machining number M2. However, the present disclosure is not limited thereto. For example, after the machining area of the machining number M1 is irradiated with the pulse laser beam at the irradiation diameter ϕ and a value obtained by subtracting the change rate Δϕ from the irradiation diameter ϕ, the machining area to be irradiated with the pulse laser beam may be changed to the machining area of the machining number M2. Thus, the number of irradiation lines irradiated with the pulse laser beam in the irradiation process in each machining area is not limited to one.

Figure 26:
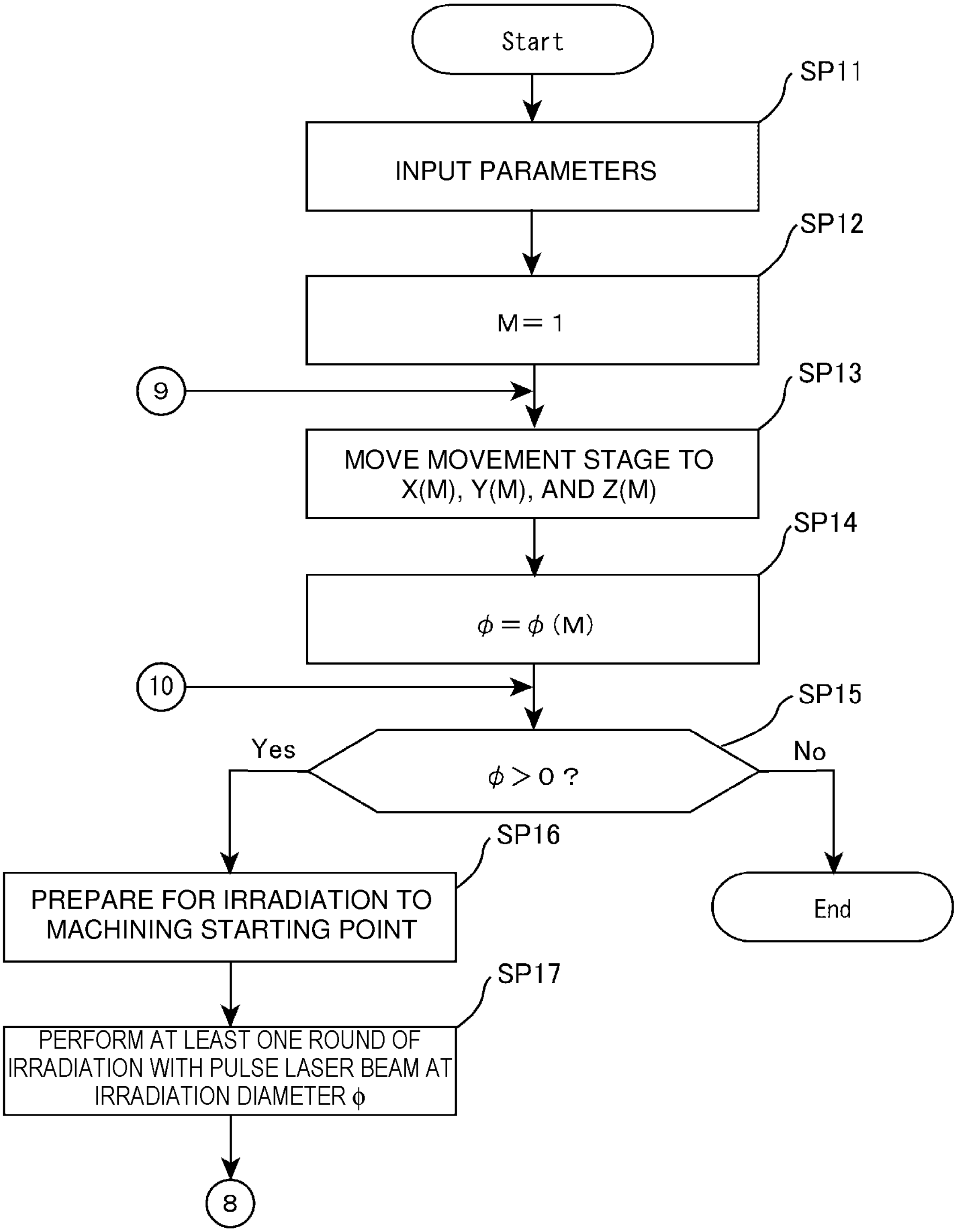
FIG. 26 is a diagram illustrating a part of a flowchart of control by a laser machining processor of Embodiment 5.
Figure 27:
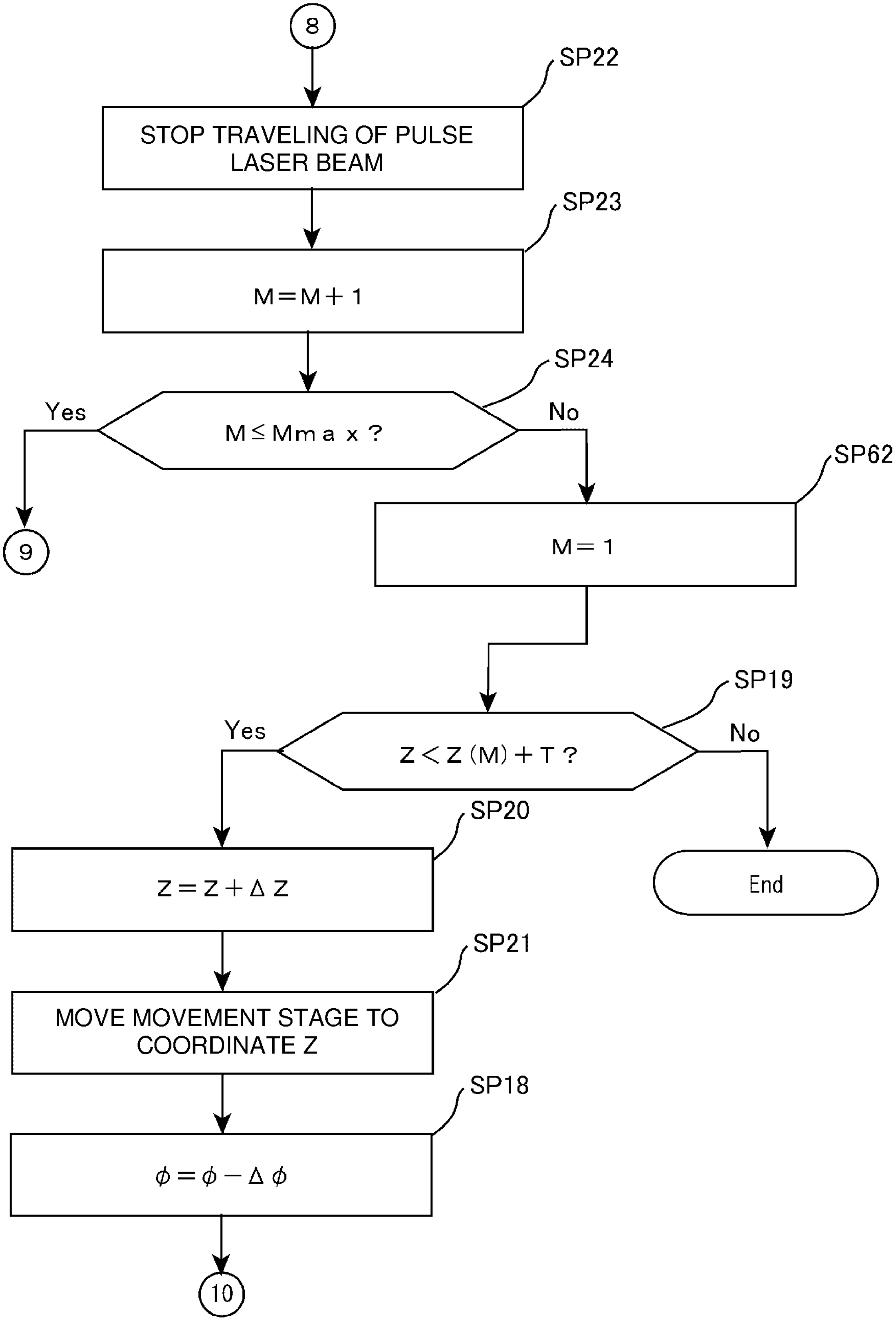
FIG. 27 is a diagram illustrating another part of the flowchart of control by the laser machining processor of Embodiment 5.

FIG. 26 is a diagram illustrating a part of the flowchart of control by the laser machining processor 310 of the present embodiment. FIG. 27 is a diagram illustrating another part of the flowchart of control by the laser machining processor 310 of the present embodiment. The flowchart of control of the present embodiment includes steps SP11 to SP24 and SP62 in the flowchart of control of Embodiment 1. The control process of the present embodiment partially differs from the control process of Embodiment 1, and the following description will be made on the difference.

As illustrated in FIG. 26, at step SP15, when the current irradiation diameter ϕ is larger than zero, the laser machining processor 310 advances the control process to step SP16. When the irradiation diameter ϕ is equal to or smaller than zero, all machined portions are formed and thus the laser machining processor 310 ends the control process. After having performed at least one round of movement and irradiation of/with the pulse laser beam at step SP17, the laser machining processor 310 advances the control process to steps SP22 to SP24 as illustrated in FIG. 27.

At step SP24 illustrated in FIG. 27, the laser machining processor 310 reads the machining number Mmax from the storage device 310*a*. When the machining number M to which one is added at step SP23 is equal to or smaller than the machining number Mmax, the laser machining processor 310 returns the control process to step SP13 illustrated in FIG. 26. When the control process proceeds to steps SP13 to SP17, irradiation in the irradiation process in the current machining area is stopped halfway through, and then the irradiation process in another machining area is performed. When the machining number M to which one is added at step SP23 is larger than the machining number Mmax at step SP24, the laser machining processor 310 advances the control process to step SP62. At step SP62, the laser machining processor 310 sets the machining number M back to the machining number M1 as the initial value and advances the control process to step SP19. At step SP19, when the current coordinate Z is smaller than the sum of the coordinate Z(M) and the thickness T, the laser machining processor 310 sequentially advances the control process to steps SP20, SP21, and SP18 and step SP15 illustrated in FIG. 26. The irradiation diameter ϕ set at step SP18 is stored in the storage device 310*a*. When the control process proceeds from step SP16 to step SP17 through step SP15, the laser machining processor 310 reads the irradiation diameter ϕ set at step SP18 from the storage device 310*a* and performs at least one round of movement and irradiation of/with the pulse laser beam at the irradiation diameter ϕ as illustrated in FIG. 25. Step SP18 is the last step of the irradiation process, and step SP21 as the movement process is performed before step SP18. Thus, the movement process of the present embodiment is performed during the irradiation process. When the coordinate Z is larger than the sum of the coordinate Z(M) and the thickness T at step SP19, all machined portions are formed and thus the laser machining processor 310 ends the control process.

7.3 Effect

In the laser machining method of the present embodiment, during the irradiation process performed in each machining areas, part of irradiation in the irradiation process in one or more machining areas and part of irradiation in the irradiation process in other one or more machining areas are alternately performed.

In the method, the machining area irradiated with the pulse laser beam changes halfway through the irradiation process. With the change of the machining area, heat concentration in the machining area due to irradiation with the pulse laser beam is reduced and local heat generation on the machining object 20 is reduced as compared to a case in which the machining area irradiated with the pulse laser beam changes after the irradiation process ends.

Figure 28:
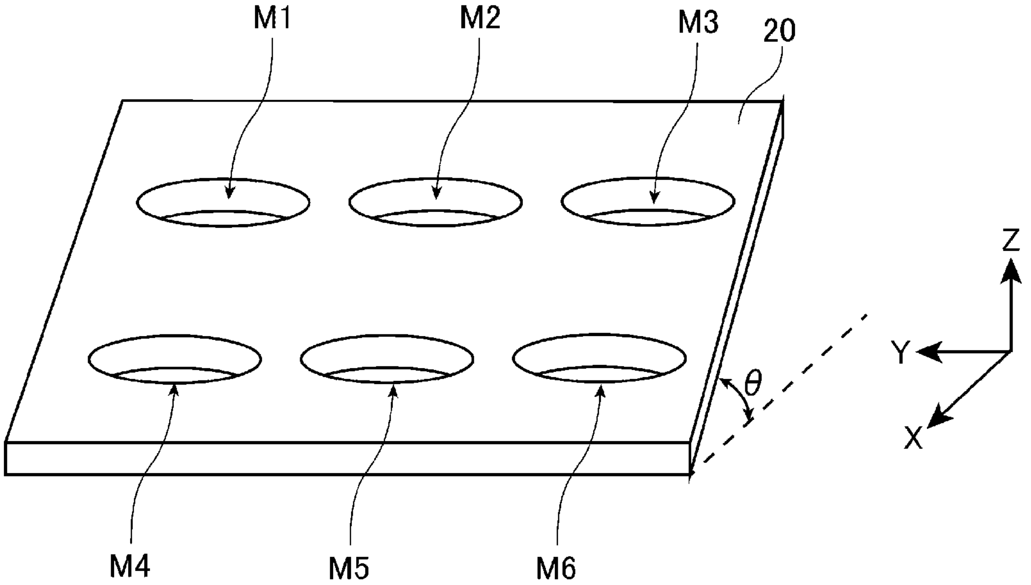
FIG. 28 is a diagram for description of a plurality of machined portions formed in a state in which a machining object is tilted relative to a Z axis.

The machining object 20 of Embodiments 4 and 5 is substantially orthogonal to the Z axis like the machining object 20 of Embodiment 1 but may be tilted relative to the Z axis like the machining object 20 of Embodiment 2. In this case, for example, machining areas of machining numbers M1 to M3 positioned at the same height position in the Z direction and machining areas of the machining numbers M4 to M6 positioned at a coordinate Z different from that of the machining areas of the machining numbers M1 to M3 are set on the machining object 20 as illustrated in FIG. 28. The machining areas of the machining numbers M4 to M6 are positioned at the same height position in the Z direction. The machining areas of the machining numbers M1 to M3 are set as a first group, and the machining areas of the machining numbers M4 to M6 are set as a second group. As in Embodiment 4 or 5, the laser machining processor 310 may form a machined portion in each machining area of the first group through movement and irradiation of/with the pulse laser beam and then form a machined portion in each machining area of the second group through movement and irradiation of/with the pulse laser beam. Accordingly, the moving amount of the movement stage 353 is reduced as compared to a case in which a machined portion of the first group and a machined portion of the second group are alternately machined.

8. Description of Modification of Gas Laser Apparatus

A modification of the gas laser apparatus 100 of Embodiment 1 will be described below. Any component identical to a component described above is denoted by the same reference sign, and duplicate description thereof is omitted unless otherwise stated.

Figure 29:
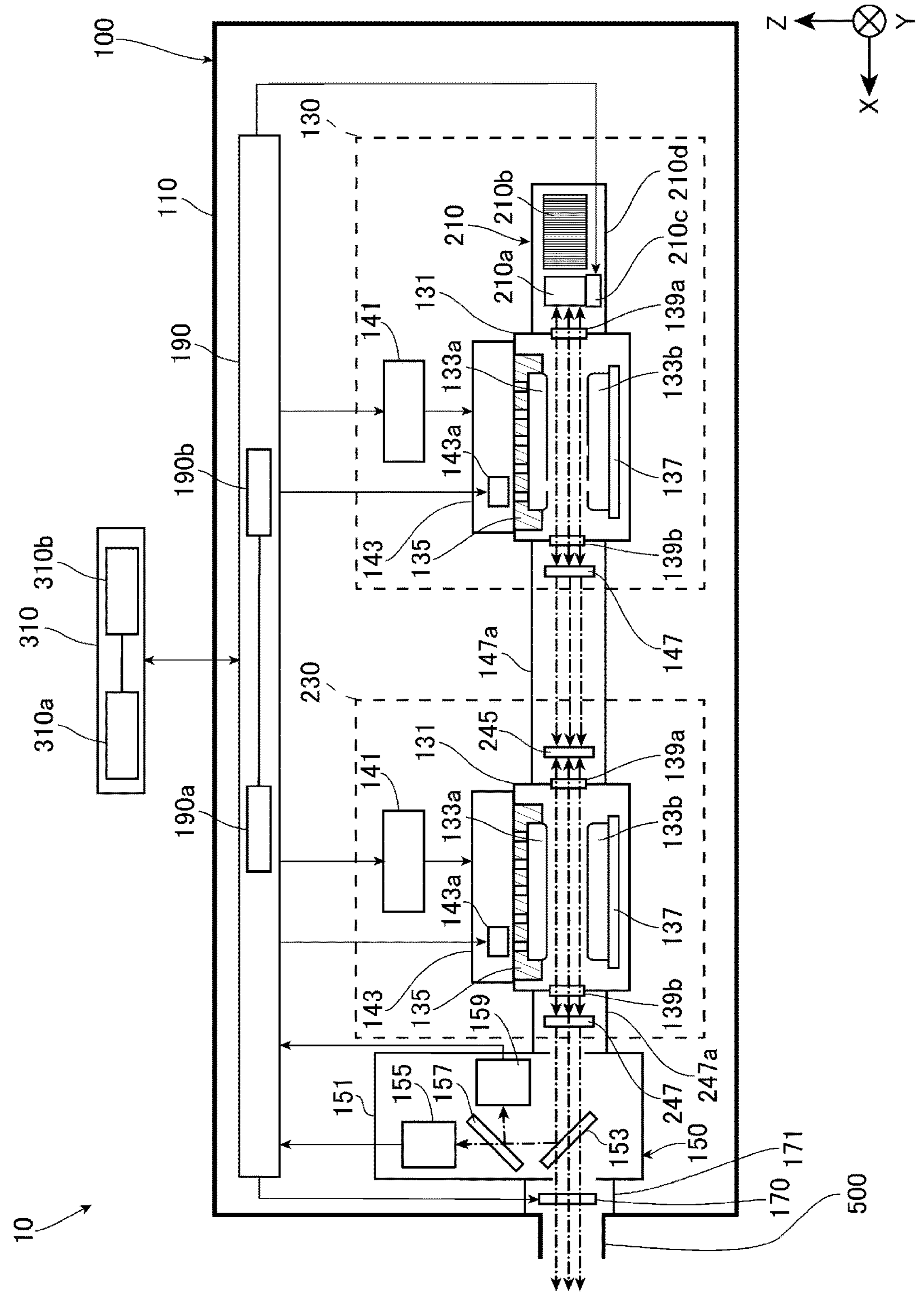
FIG. 29 is a schematic diagram illustrating an example of the entire schematic configuration of a gas laser apparatus of a modification.

FIG. 29 is a schematic diagram illustrating an example of the entire schematic configuration of the gas laser apparatus 100 of the modification.

The monitor module 150 additionally includes a beam splitter 157 and a wavelength monitor 159.

The beam splitter 157 is disposed between the beam splitter 153 and the optical sensor 155. The beam splitter 157 reflects part of light reflected by the beam splitter 153 and transmits the other part. The light having transmitted through the beam splitter 157 is incident on the optical sensor 155, and the light reflected by the beam splitter 157 is incident on the wavelength monitor 159.

The wavelength monitor 159 is a well-known etalon spectrometer. The etalon spectrometer is constituted by, for example, a diffusion plate, an air gap etalon, a light condensing lens, and a line sensor. The etalon spectrometer generates an interference fringe of an incident pulse laser beam through the diffusion plate and the air gap etalon and images the generated interference fringe on the light receiving surface of the line sensor through the light condensing lens. Then, the interference fringe imaged on the line sensor is measured to measure the wavelength λ of the pulse laser beam. The wavelength monitor 159 is electrically connected to the laser processor 190 and outputs a signal indicating data of the measured wavelength λ of the pulse laser beam to the laser processor 190.

The gas laser apparatus 100 includes a line narrowing module 210 in place of the rear mirror 145 in the master oscillator 130. The line narrowing module 210 includes a prism 210*a*, a grating 210*b*, a rotation stage 210*c*, and a housing 210*d* in which the prism 210*a*, the grating 210*b*, and the rotation stage 210*c* are housed. Light output from the window 139*a* of the laser chamber 131 has a beam width expanded through the prism 210*a* and is incident on the grating 210*b*. Reflected light from the grating 210*b* has a beam width reduced through the prism 210*a* and is returned to the internal space of the laser chamber 131 through the window 139*a*.

The surface of the grating 210*b* is made of a high reflectance material, and a large number of grooves are formed at a predetermined interval on the surface. The grating 210*b* is a dispersion optical element. Each groove has a sectional shape of, for example, a right triangle. Light incident on the grating 210*b* from the prism 210*a* is reflected by the grooves and diffracted in a direction in accordance with the wavelength of the light. The grating 210*b* is disposed in Littrow arrangement such that the incident angle of light incident on the grating 210*b* from the prism 210*a* matches the diffracting angle of diffracting light at a desired wavelength. Accordingly, light having a wavelength near the desired wavelength is returned to the laser chamber 131 through the prism 210*a*.

The rotation stage 210*c* supports the prism 210*a* and rotates the prism 210*a* about the Z axis. The incident angle of light on the grating 210*b* is changed by rotating the prism 210*a*. Thus, the wavelength of light returning from the grating 210*b* to the laser chamber 131 through the prism 210*a* can be selected by rotating the prism 210*a*. Accordingly, the gas laser apparatus 100 corresponds to a variable-wavelength laser apparatus capable of changing the wavelength of a pulse laser beam to be output. The number of prisms in the line narrowing module 210 is one in the present example but not particularly limited as long as at least one rotatable prism such as the rotation stage 210*c* is included.

A laser resonator is constituted by the output coupling mirror 147 and the grating 210*b* provided with the laser chamber 131 interposed therebetween, and the laser chamber 131 is disposed on the optical path of the laser resonator. Thus, light from the internal space of the laser chamber 131 reciprocates between the grating 210*b* of the line narrowing module 210 and the output coupling mirror 147 through the windows 139*a* and 139*b* and the prism 210*a*. The reciprocating light is amplified each time the light passes through the laser gain space between the electrodes 133*a* and 133*b*. Part of the amplified light transmits through the window 139*b* and the output coupling mirror 147 and is incident as a pulse laser beam on a power oscillator 230 to be described later.

In the master oscillator 130, similarly to Embodiment 1, the laser processor 190 applies high voltage between the electrodes 133*a* and 133*b* by controlling the charger 141 and the switch 143*a* in the pulse power module 143. When the high voltage is applied between the electrodes 133*a* and 133*b*, insulation between the electrodes 133*a* and 133*b* breaks down and discharge occurs. A laser medium contained in the laser gas between the electrodes 133*a* and 133*b* is excited by energy of the discharge and then discharges spontaneously emitted light when returning to the ground state. Part of the light is ultraviolet light and transmits through the window 139*a*. The transmitting light is enlarged in the traveling direction of the light each time the light transmits through the prism 210*a*. The light is also subjected to wavelength dispersion when transmitting through the prism 210*a* and is guided to the grating 210*b*. The light is incident on the grating 210*b* at a predetermined angle and diffracted, and the light having a predetermined wavelength is reflected by the grating 210*b* at a reflection angle equal to the incident angle. The light reflected by the grating 210*b* passes through the prism 210*a* and propagates to the internal space of the laser chamber 131 again through the window 139*a*. The wavelength of the light propagating to the internal space of the laser chamber 131 is line-narrowed not to include any absorption line of oxygen. With the line-narrowed light, the excited laser medium undergoes stimulated emission and the light is amplified. The light travels to the output coupling mirror 147 through the window 139*b*. Part of the light transmits through the output coupling mirror 147, and the other part of the light is reflected by the output coupling mirror 147 and propagates to the internal space of the laser chamber 131 through the window 139*b*. The light having propagated to the internal space of the laser chamber 131 travels to the grating 210*b* through the window 139*a* and the prism 210*a* as described above. In this manner, light having the predetermined wavelength reciprocates between the grating 210*b* and the output coupling mirror 147. The light is amplified each time the light passes through the discharge space in the internal space of the laser chamber 131, and laser oscillation occurs. Then, part of the laser beam transmits through the output coupling mirror 147 and is incident as a pulse laser beam on the power oscillator 230.

The gas laser apparatus 100 further includes the power oscillator 230 corresponding to an amplifier. The power oscillator 230 is disposed on the optical path of the pulse laser beam between the master oscillator 130 and the monitor module 150. The power oscillator 230 is an amplifier that amplifies energy of the pulse laser beam output from the master oscillator 130.

The power oscillator 230 has the same basic configuration as the master oscillator 130, and similarly to the master oscillator 130, includes the laser chamber 131, the charger 141, and the pulse power module 143. The power oscillator 230 includes a Fabry-Perot laser resonator constituted by an output coupling mirror 247 and a rear mirror 245. The output coupling mirror 247 and the rear mirror 245 reflect part of the pulse laser beam and transmit the other part. For example, the reflectance of the output coupling mirror 247 may be substantially 10% to 30%, and the reflectance of the rear mirror 245 may be substantially 80% to 90%. The output coupling mirror 247 faces the beam splitter 153, and the rear mirror 245 faces the output coupling mirror 147. The rear mirror 245 is disposed in the internal space of the optical path pipe 147*a* together with the output coupling mirror 147. The output coupling mirror 247 is disposed in the internal space of an optical path pipe 247*a*. The optical path pipe 247*a* has the same configuration as the optical path pipe 147*a*.

When having received a signal indicating data received from the laser machining processor 310 such as the target pulse energy Et and a target wavelength λt, the laser processor 190 controls the charging voltage of the charger 141 in the master oscillator 130, the charging voltage of the charger 141 in the power oscillator 230, and rotation of the rotation stage 210*c* in the line narrowing module 210 so that laser oscillation occurs at the target values. The target wavelength λt may be, for example, a wavelength not corresponding to any absorption line of oxygen in an amplification region for an ArF excimer laser beam. Such a wavelength may be, for example, 193.40 nm.

After having received the light emission trigger Tr from the laser machining processor 310, the laser processor 190 causes the master oscillator 130 to perform laser oscillation. In addition, the laser machining processor 310 drives the power oscillator 230 in synchronization with the master oscillator 130. The laser processor 190 turns on the switch 143*a* of the pulse power module 143 of the power oscillator 230 so that discharge occurs when a pulse laser beam output from the master oscillator 130 is incident on the discharge space in the laser chamber 131 of the power oscillator 230. As a result, the pulse laser beam incident on the power oscillator 230 is subjected to amplified oscillation in the power oscillator 230.

The pulse energy and wavelength of the pulse laser beam amplified at the power oscillator 230 and output are measured by the monitor module 150. The laser processor 190 controls the charging voltage of the charger 141 in the master oscillator 130, the charging voltage of the charger 141 in the power oscillator 230, and the line narrowing module 210 in the master oscillator 130 so that the actual values of the measured pulse energy and wavelength approach the target pulse energy Et and the target wavelength λt, respectively.

When the laser processor 190 opens the shutter 170, the pulse laser beam having transmitted through the beam splitter 153 in the monitor module 150 is incident on the laser machining apparatus 300.

The wavelength of the pulse laser beam is line-narrowed not to include any absorption line of oxygen. Thus, in the laser machining apparatus 300, nitrogen gas that is inert gas does not need to be always flowing in the internal space of the housing 355, in which the machining object 20 is disposed, when the laser machining system 10 is in operation. Moreover, a CMC can be processed with the pulse laser beam even when no inert gas flows.

As in the gas laser apparatus 100, the pulse energy of a pulse laser beam can be increased by providing the power oscillator 230 as an amplifier. High pulse energy is often needed in laser machining. When a line-narrowed pulse laser beam is used in laser machining as in the present example, the pulse energy decreases as compared to a case in which a pulse laser beam subjected to spontaneous oscillation is used. In the gas laser apparatus 100 of the present example, decrease of the pulse energy is reduced by an amplifier capable of increasing the pulse energy.

Although a Fabry-Perot resonator is provided as an amplifier in the present example, a ring resonator may be provided instead. Moreover, the power oscillator 230 may include a convex mirror and a concave mirror in place of the output coupling mirror 247 and the rear mirror 245.

The master oscillator 130 may include a semiconductor laser configured to output a seed beam, a titanium sapphire amplifier configured to amplify the seed beam, and a wavelength conversion system.

The semiconductor laser is a distributed-feedback semiconductor laser configured to output, as the seed beam, a continuous wave (CW) laser beam having a wavelength of 773.6 nm and performing continuous oscillation. The oscillation wavelength can be changed by changing temperature setting of the semiconductor laser.

The titanium sapphire amplifier includes a titanium sapphire crystal and a pumping pulse laser apparatus. The titanium sapphire crystal is disposed on the optical path of the seed beam. The pumping pulse laser apparatus outputs second harmonic light of YLF laser.

The wavelength conversion system generates fourth harmonic light having a central wavelength near 193.40 nm and includes an LBO ($LiB_3O_5$) crystal and a KBBF ($KBe_2BO_3F_2$) crystal that performs wavelength conversion from a basic wave into fourth harmonic light. Each crystal is disposed on a non-illustrated rotation stage and can change the incident angle of the seed beam on the crystal.

The master oscillator 130 may include a solid-state laser device configured to output a laser beam of ultraviolet light having a central wavelength near 193.40 nm, and a wavelength conversion system including a non-linear crystal. In this case, the master oscillator 130 corresponds to a variable-wavelength laser apparatus, and a laser beam does not need to be oscillated in the amplification region of ArF laser but may be oscillated in the wavelength range of 175 nm to 200 nm in which absorption by oxygen occurs.

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious for those skilled in the art that embodiments of the present disclosure would be appropriately combined.

The terms used throughout the present specification and the appended claims should be interpreted as non-limiting terms. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of any thereof and any other than A, B, and C.

What is claimed is:

1. A laser machining method of forming a machined portion in a machining area of a machining object by irradiating the machining area with a pulse laser beam, the laser machining method comprising:

an irradiation process of irradiating the machining area with the pulse laser beam output from an excimer laser apparatus by guiding the pulse laser beam to part of the machining area and moving the guided pulse laser beam through irradiation spots; and a movement process of moving the machining object in a height direction of the machining object, the irradiation process being performed at a plurality of height positions on the machining object moved in the height direction in the movement process, and at least part of each of the irradiation spots of the pulse laser beam overlapping another irradiation spot adjacent to the irradiation spot in the irradiation process, wherein in the irradiation process, a plane direction of the machining area is tilted relative to the optical axis of the pulse laser beam.

2. The laser machining method according to claim 1, wherein in the irradiation process, at least one round of irradiation with the pulse laser beam is performed along one or more irradiation lines of a plurality of irradiation lines in the machining area and then along other one or more irradiation lines of the irradiation lines, the irradiation lines being arranged concentrically.

3. The laser machining method according to claim 2, wherein in the irradiation process, at least one round of irradiation with the pulse laser beam is performed along each of the irradiation lines in order from an outermost irradiation line to an innermost irradiation line.

4. The laser machining method according to claim 1, wherein the irradiation process and the movement process are alternately repeated.

5. The laser machining method according to claim 1, wherein the movement process is performed during the irradiation process.

6. The laser machining method according to claim 1, wherein in the irradiation process, a light condensation position of the pulse laser beam is located between upper and lower ends of the machining area in the height direction.

7. The laser machining method according to claim 6, wherein in the irradiation process, the light condensation position is located at a middle point between the upper and lower ends.

8. The laser machining method according to claim 1, wherein the movement process is performed during the irradiation process, and in the movement process, the machining object is moved in the height direction in synchronization with a position of each irradiation spot of the pulse laser beam in a direction orthogonal to the height direction without change of a diameter of each irradiation spot in the irradiation process, the pulse laser beam condensing to the machining area of the machining object.

9. The laser machining method according to claim 8, further comprising a measurement process of measuring a height position of the machining area before the irradiation process, wherein in the movement process, the machining object is moved to the height position measured in the measurement process.

10. The laser machining method according to claim 1, wherein the machining object has a plurality of the machining areas that are discontinuously positioned, the machined portion is formed in each of the machining areas through irradiation of the machining area with the pulse laser beam, and the irradiation process performed in the machining areas and the movement process are alternately performed.

11. The laser machining method according to claim 10, wherein during the irradiation process performed in the machining areas, after all irradiation in the irradiation process in one or more machining areas of the machining areas is completed, the irradiation process in other one or more machining areas of the machining areas is performed.

12. The laser machining method according to claim 10, wherein in the irradiation process performed in the machining areas, part of irradiation in the irradiation process in one or more machining areas of the machining areas and part of irradiation in the irradiation process in other one or more machining areas of the machining areas are alternately performed.

13. The laser machining method according to claim 1, wherein the machining object is a ceramic matrix composite.

14. The laser machining method according to claim 1, wherein a diameter of each irradiation spot is 30 μm to 2 mm inclusive.

15. The laser machining method according to claim 1, wherein pulse energy of the pulse laser beam is 0.1 mJ to 30 mJ inclusive.

16. The laser machining method according to claim 1, wherein an amount of difference between each irradiation spot and another irradiation spot adjacent to the irradiation spot is 0.5% to 100% inclusive of a diameter of the irradiation spot.

17. The laser machining method according to claim 1, wherein the machining object is disposed in an internal space of a housing in which inert gas flows.

18. The laser machining method according to claim 1, wherein the pulse laser beam has a wavelength narrowed to include no absorption line of oxygen.

19. A laser machining system for forming a machined portion in a machining area of a machining object by irradiating the machining area with a pulse laser beam, the laser machining system comprising:

an irradiation optical system configured to irradiate the machining area with the pulse laser beam output from an excimer laser apparatus by guiding the pulse laser beam to part of the machining area and moving the guided pulse laser beam through irradiation spots;

an fθ lens through which the pulse laser beam from the irradiation optical system is condensed to the machining area;

a movement stage configured to move the machining object in a height direction of the machining object; and a table configured to support the machining object and supported by the movement stage, the irradiation optical system performing irradiation with the pulse laser beam at a plurality of height positions on the machining object moved in the height direction by the movement stage, and at least part of each of the irradiation spots of the pulse laser beam overlapping another irradiation spot adjacent to the irradiation spot, wherein the table is configured such that a plane direction of the machining area is tilted relative to the optical axis of the pulse laser beam.

20. A laser machining method of forming a machined portion in a machining area of a machining object by irradiating the machining area with a pulse laser beam, the laser machining method comprising:

an irradiation process of irradiating the machining area with the pulse laser beam output from an excimer laser apparatus by guiding the pulse laser beam to part of the machining area and moving the guided pulse laser beam through irradiation spots; and a movement process of moving the machining object in a height direction of the machining object, the irradiation process being performed at a plurality of height positions on the machining object moved in the height direction in the movement process, and at least part of each of the irradiation spots of the pulse laser beam overlapping another irradiation spot adjacent to the irradiation spot in the irradiation process, wherein the machining object is a ceramic matrix composite.

* * * * *